United States Patent
Carbonaro

(10) Patent No.: US 8,631,615 B2
(45) Date of Patent: Jan. 21, 2014

(54) APPARATUS FOR A WIND RESISTANT AND POST LOAD RE-TENSIONING SYSTEM UTILIZING A COMPOSITE FABRIC AND ATTACHMENT APPARATUS

(75) Inventor: Peter Carbonaro, Chicago, IL (US)

(73) Assignee: Windwrap, Inc., Chicago, IL (US)

( * ) Notice: Subject to any disclaimer, the term of this patent is extended or adjusted under 35 U.S.C. 154(b) by 606 days.

(21) Appl. No.: 12/726,116

(22) Filed: Mar. 17, 2010

(65) Prior Publication Data
US 2010/0236158 A1     Sep. 23, 2010

Related U.S. Application Data

(60) Provisional application No. 61/161,243, filed on Mar. 18, 2009.

(51) Int. Cl.
*E04H 9/14*     (2006.01)

(52) U.S. Cl.
USPC .............................. 52/222; 52/506.05; 52/512

(58) Field of Classification Search
USPC ............... 52/23, 92.1, 92.2, 92.3, 222, 223.1, 52/223.14, 291, 506.05, DIG. 11, DIG. 12, 52/DIG. 14, 273, 511, 512
See application file for complete search history.

(56) References Cited

U.S. PATENT DOCUMENTS

| | | | |
|---|---|---|---|
| 3,805,873 A * | 4/1974 | Bloomfield | 160/392 |
| 3,830,024 A | 8/1974 | Warnke | 52/23 |
| 4,053,008 A * | 10/1977 | Baslow | 160/327 |
| 4,397,122 A * | 8/1983 | Cros | 52/3 |
| 4,757,854 A * | 7/1988 | Rippberger | 160/391 |
| 4,815,562 A * | 3/1989 | Denny et al. | 182/138 |
| 4,986,332 A * | 1/1991 | Lanuza | 160/327 |
| 5,046,545 A * | 9/1991 | Loomis et al. | 160/368.1 |
| 5,311,712 A | 5/1994 | Accousti | 52/259 |
| 5,333,425 A | 8/1994 | Nickerson et al. | 52/222 |
| 5,355,640 A | 10/1994 | Frye | 52/23 |
| 5,448,861 A | 9/1995 | Lawson | 52/92.2 |
| 5,531,054 A | 7/1996 | Ramirez | 52/741.1 |
| 5,537,786 A | 7/1996 | Lozier et al. | 12/23 |
| 5,603,186 A | 2/1997 | Zaffino | 52/23 |
| 5,870,861 A | 2/1999 | Gnaedinger | 52/93.1 |
| 5,953,875 A * | 9/1999 | Harkins | 52/407.3 |
| 6,164,364 A * | 12/2000 | Morris | 160/327 |
| 6,256,951 B1 | 7/2001 | Findleton | 52/250 |
| 6,305,111 B1 * | 10/2001 | Opdahl | 40/603 |

(Continued)

OTHER PUBLICATIONS

Brochure : Red Head Concrete Anchoring Specialists, Redi-Drive Anchors, pp. 79-82.

(Continued)

*Primary Examiner* — Robert Canfield
(74) *Attorney, Agent, or Firm* — Winston & Strawn LLP

(57) ABSTRACT

A roof fastening system that joins building walls or roof structures of a building frame to its foundation to provide a continuous load path that resists upward and lateral forces without interfering with the natural downward forces exerted on the frame over time. This system includes a composite material that combines the properties of a house wrap with high tensile strength low elongation fibers along one direction of the fabric and lower tensile strength high elongation fibers along one or more fabric directions that cross the high tensile strength low elongation fibers. The composite material extends from the top plates or heel truss of the framing of the structure down to its foundation to hold the frame together against high wind loading.

13 Claims, 23 Drawing Sheets

(56) References Cited

U.S. PATENT DOCUMENTS

| | | | |
|---|---|---|---|
| 6,324,797 B1* | 12/2001 | Fago et al. | 52/222 |
| 6,325,085 B1* | 12/2001 | Gower | 135/90 |
| 6,339,889 B1* | 1/2002 | Griesemer et al. | 40/603 |
| 6,412,540 B2* | 7/2002 | Hendee | 160/327 |
| 6,598,651 B2* | 7/2003 | Ehrenberger et al. | 160/238 |
| 6,684,584 B1 | 2/2004 | Goldwitz | 52/222 |
| 6,758,306 B2* | 7/2004 | Walls et al. | 182/138 |
| 6,760,990 B2* | 7/2004 | Lowndes | 40/603 |
| 6,843,027 B2 | 1/2005 | Gaddie et al. | 52/92.1 |
| 6,886,299 B2* | 5/2005 | Gower | 52/222 |
| 6,886,300 B2* | 5/2005 | Hudoba et al. | 52/222 |
| 7,392,620 B1* | 7/2008 | Watson, Jr. | 52/4 |
| 7,578,100 B2* | 8/2009 | Sicurella | 52/4 |
| 7,900,408 B2* | 3/2011 | Holland et al. | 52/202 |
| 7,963,313 B1* | 6/2011 | Bennett et al. | 160/368.1 |
| 7,980,033 B1* | 7/2011 | Fyfe | 52/271 |
| 8,215,073 B2* | 7/2012 | Gorman et al. | 52/202 |
| 2004/0154242 A1* | 8/2004 | Hudoba et al. | 52/202 |
| 2006/0207191 A1* | 9/2006 | Sutton | 52/4 |
| 2007/0204533 A1* | 9/2007 | Gower | 52/202 |
| 2007/0227083 A1* | 10/2007 | Skobba | 52/202 |
| 2007/0234658 A1 | 10/2007 | Rawdon et al. | 52/222 |
| 2007/0281562 A1 | 12/2007 | Kohlman et al. | 442/32 |
| 2008/0110583 A1 | 5/2008 | Lallemand | 160/371 |
| 2008/0313979 A1* | 12/2008 | Holland et al. | 52/202 |
| 2008/0313980 A1* | 12/2008 | Holland et al. | 52/202 |
| 2009/0042471 A1 | 2/2009 | Cashin et al. | 442/182 |
| 2009/0049765 A1 | 2/2009 | Grant | 52/105 |
| 2009/0307988 A1* | 12/2009 | Hamlin, III | 52/23 |
| 2010/0107528 A1* | 5/2010 | Toledo | 52/222 |
| 2010/0126091 A1* | 5/2010 | Meyer | 52/222 |

OTHER PUBLICATIONS

Brochure: ES Report™ on Bostitch Sheather Plus™(Hurriquake™) Nails, ESR-2020, pp. 1-6 (2006), Apr. 2006.

Brochure, Maxi-Set Tapcon Masonry Fastening System, Light-To-Medium Duty Masonry Applications Product Report No. 02718 , : ITW Buildex, pp. 45-46 (2007).

* cited by examiner

PRIOR ART

APPARATUS FOR A WIND RESISTANT AND POST LOAD RE-TENSIONING SYSTEM UTILIZING A COMPOSITE FABRIC AND ATTACHMENT APPARATUS

CROSS-REFERENCE TO RELATED APPLICATION

This application is based on and claims priority to U.S. Provisional Application 61/161,243 filed on Mar. 18, 2009, the entire content of which is expressly incorporated herein.

BACKGROUND OF THE INVENTION

Most commercial and residential buildings along with other structures are built using various framing methods. In particular, platform and balloon framing using wooden wall studs, floor joists and rafters are common practice for homes, and small offices and apartment buildings. In platform framing, the typical structure has a footing supporting a foundation wall with a flat top surface on which a sill plate is anchored. The wall studs are secured to the sill plate using nails as required by local codes, and a lower top plate and upper top plate are nailed to the other end of the wall studs to form the top supporting surface of the walls. Plywood or OSB sheathing is then typically nailed to the outside face of the stud walls to provide rigidity and strength against the sideways movement of the studs. The rafters or roof trusses and blocking would then be nailed to and supported by the top plates. The use of nails in such framing methods provides adequate resistance to the lateral motion of the framing components relative to each other and helps to prevent the framing members from pulling away from each other. The amount of leverage high winds and rapid changes in atmospheric pressure can produce at various locations within a structure's framing, however, can easily be sufficient to crack the framing members or pry the nails up at the fastening points. The uplifting force of a strong wind under an overhanging eave can be similar to the leverage provided by the claw end of a hammer used for pulling up nails. Similarly, a strong wind catching an insufficiently nailed edge or corner of a plywood sheet can pull the fastening nails out of the studs. To prevent such unfastening at the joining points, other types of fastening devices are used to add strength and resist the prying action on the nails and frame members by turning the nail's fastening direction by 90 degrees and relying upon the nails greater resistance to transverse forces. These aspects of basic framing are readily understood by those of ordinary skill in the art of framing and construction.

Another material used in frame construction is a weather resistant barrier known as house wrap or paper by those of ordinary skill in the art. House wrap is used to cover the outside of a structure to prevent the infiltration of drafts or wind and liquid water, while allowing water vapor to escape from the building.

In many locations throughout this country and in other places around the world, storms and other atmospheric events subject these existing frame structures to forces that can pull off roofs and strip siding and sheathing from the supporting walls. The typical residential or commercial building mentioned above is designed to support the downward load of the building above it. A foundation, therefore, supports the weight of the walls, flooring, rafters and roofing resting upon it, while the walls support the stories and roofing resting upon it, and the rafters or trusses support the weight of shingles and roofing materials, as well as occasional dead loads like snow. Such a typical design, however, fails to take into account the lateral or lifting forces that can be caused by high winds and sudden changes in atmospheric pressure that can occur during storms such as hurricanes or tornados. Seismic events can also create lateral forces that apply unexpected loads to a building's frame. The various means implemented to help secure the framing members of such structures against these forces, such as straps, clips and brackets tie the rafters or trusses of a roof to the upper members of the supporting walls to resist the winds that can catch overhanging eaves and pry the roof up. Some of these fasteners are rigid metal tie bars that extend from the roofing components to the building's foundation at discrete points along the length of the building as disclosed in Gnaedinger U.S. Pat. No. 5,870,861. These prior devices, however, do not secure the entire length of a building against both lateral and upward forces without interfering with the natural downward forces exerted on the frame over time. The rigid bars or brackets interfere with the downward loading of the building's structure because their rigid nature resists movement of the frame during its natural shrinkage and settling. Cabling has also been used to separately secure rafters to a foundation as disclosed in Gaddie et al. U.S. Pat. No. 6,843,027, however such devices also only provide discrete fastening points to separate framing components rather than a way to comprehensively secure all the framing components uniformly over a continuous extended length of a frame structure, and would not provide lateral support.

Previous attempts involving attaching a high strength wall covering to the top and bottom ends of a wall have placed the wall covering on the interior side of the wall, as disclosed in the Gnaedinger patent. In such a position, however, the wall covering is incapable of aiding resistance to the lateral forces directed against the exterior wall, such as from high winds, since these forces tend to push the wall in the same direction as the tensile force being exerted by the wall covering. A flexible material attached along the interior side, therefore, does not prevent a wall from toppling inwards.

A sheet has also been used as lateral bracing in a building structure by spanning a pair of separated vertical supports or studs and reaching from a foundation to upper stories, as disclosed in Findleton U.S. Pat. No. 6,256,951.

SUMMARY OF THE INVENTION

The present invention relates to a roof fastening system that overcomes the deficiencies of the previous devices and aids in tying a building's walls and/or roof structure to the structure's foundation to provide a continuous load path that resists upward and lateral forces without interfering with the natural downward forces exerted on the frame over time. It also relates to a roof fastening system that aids in tying the trusses of a building's roof structure to the building's foundation thereby providing a continuous load path from the strongest anchoring point at the foundation to the portion of the structure that can experience the greatest upward and lateral forces. The present invention also relates to the use of a composite material in a roof fastening system that combines the properties of a house wrap with high tensile strength low elongation fibers along one direction of the fabric and lower tensile strength higher elongation fibers along one or more fabric directions that cross(es) the high tensile strength low elongation fibers. The system utilizes this composite fabric such that it extends from the top plates or truss roofing members of a structure's framing, down to its foundation forming a fastening apparatus that allows re-tensioning or post load re-tensioning.

In particular, the invention provides a roof fastening system to aid in providing to a structure a continuous load path, from the foundation up to the top plates of the upper floor and the adjoining roofing. It also relates to a roof fastening system to aid in providing to a structure a continuous load path from the foundation up to the heel wall of a raised or high heel roof truss. The fastening apparatus provides a means for attaching a composite fabric with high tensile strength and with certain low elongation properties from the top plates of a structure's framing, down to its foundation while at the same time allowing re-tensioning or post load re-tensioning of that composite fabric. The re-tensioning provides for taking up any slack in the system caused by loading and or lumber curing shrinkage.

The system attachment pieces in one instance are manufactured in a manner which provides one assembly with two (2) break-off members, yielding three (3) assembly pieces, and in another instance are manufactured in a manner which provides one assemble with a break-off member, yielding two (2) pieces. The system attachment pieces in another instance are manufactured in a manner which provides individually manufactured pieces.

The invention relates to keeping a structure and its roof in place during a high wind event. It also relates to helping keep the structure on its foundation and its roof in place during a seismic event. It utilizes the composite fabric to affix to either (1), the top plates of the structure's stud wall, or (2), from the heel wall of a raised or high heel roof truss, down to the foundation of the structure. It utilizes an attachment system which provides the ability to re-tension or post load re-tension the composite fabric once the roof loading is in place. It utilizes an attachment system which provides the ability to install on a brick ledge for brick veneer applications with a post-load or re-tightening capability. This invention affords the benefit of utility and economy of utilization of two products, i.e. composite fabric and its mounting bracket assemblies, and its associated labor, to accomplish continuous load path benefits, to accomplish seismic benefits, to provide water hold out, to provide vapor management and to provide an air barrier. The invention also affords the benefits of resistance to projectile penetrating forces, to overturning forces, racking forces, sliding forces, and other forces that can reduce structural integrity.

The composite fabric offers structural benefits, both providing a continuous load path from the top plates of a structure down to its foundation, and providing seismic benefits, allowing a structure to better perform during high wind and seismic events. In addition the composite fabric offers structural benefits, both providing a continuous load path from the heel wall of a raised or high heel roof truss, down to the structure's foundation, thus providing seismic benefits and better performance during high wind and seismic events. It also provides the benefits of house wrap providing water holdout, an air barrier, and moisture vapor management.

The foregoing advantages and benefits are obtained by the present invention which in one embodiment provides a structural fastening apparatus comprising a flexible sheeting having top and bottom edge portions; a first holding member attached along the top edge portion of the flexible sheeting; a second holding member attached along the bottom edge portion of the flexible sheeting; and a retaining member that is configured and dimensioned to receive at least a portion of the second holding member for tensioning the flexible sheeting.

In this apparatus, the flexible sheeting can be attached to the first and second holding members by wrapping the top and bottom edge portions of flexible sheeting around the first and second holding members respectively. Also, the edge portions are affixed to the holding members with an adhesive for a more secure bond, where the adhesive can be a glue or epoxy or an adhesive tape such as a double sided tape. The retaining member is typically a mounting bracket that is configured and dimensioned for attachment to a building foundation, and includes a flange for engaging the second holding member portion. That mounting bracket has openings for accepting fasteners suitable for anchoring the mounting bracket to a cement, block or brick foundation, and further wherein at least some of the openings are vertical slots that facilitate movement of the retaining member to apply tension to the flexible sheeting.

Preferably, the first holding member has openings for accepting mechanical fasteners for mechanically anchoring the first holding member to an upper portion of a building frame; the second holding member is secured to the mounting bracket flange such that the flexible sheeting provides a continuous tensile load path between the upper portion of the building frame and the building foundation, in order to direct upward or lateral forces to the building foundation.

The apparatus may further comprise fasteners having an extended length to provide a gap between the bottom surface of the mounting bracket and an upper surface of a building foundation to adjust the tensioning of the flexible sheeting by tightening or loosening the fasteners, thereby reducing or increasing the gap between the mounting bracket and the upper surface of the foundation.

In a more preferred embodiment, the first holding member is either a top mounting plate, a side mounting plate or a truss mounting plate; the second holding member is a batten bar; and the flexible sheeting is a composite fabric comprising a mat layer that is vapor-permeable and one or more reinforcing layers optionally attached to the mat layer. The reinforcing layer may be a scrim layer comprising high-strength low-elongation fibers in a direction running from the first holding member to the second holding member, and lower strength higher elongation fibers running parallel or diagonal to the first and the second holding members.

Yet another embodiment of the invention relates to a frame structure having at least a roofing member and one or more wall members erected upon a foundation. This structure comprises a structural fastening apparatus according to claim 4 for providing a continuous tensile load path between the roofing member and the structure's foundation to direct upward or lateral forces to the structure's foundation. Advantageously, the first holding member is mechanically affixed to an upper portion of a frame building wall; the mounting bracket is mechanically anchored to the structure's foundation; at least a portion of the second holding member is secured to the mounting bracket; and the flexible sheeting is attached to the first and second holding members.

In these frame structures, the flexible sheeting may be positioned on the outside face of the frame, and is directly adjacent to and in contact with a sheathing layer of an exterior frame wall, to create a continuous load path from the upper portion of a building wall frame to the foundation along a length of the building wall. The frame structure may further comprise one or more polymer batten strips or an additional scrim layer or a plurality of scrim layers, affixed to an exterior frame wall, wherein the polymer batten strips or the additional scrim layer or the plurality of scrim layers, are affixed in a vertical direction adjacent to one or more openings framed into the exterior frame wall to create a reinforced continuous load path from the upper top plate or upper portion of a building wall frame to the foundation.

The frame structure can further comprise a roof fastening member mechanically affixed to and operatively connecting one or more roofing member(s) to the building wall frame.

Also, the first holding member preferably has openings for accepting mechanical fasteners for fastening the first holding member in a sideways position to a plurality of roof trusses and blocking members, with the first securing member being mechanically anchored to the building wall frame in a vertical position by mechanical fasteners. The frame structure can also have the mounting bracket mechanically anchored to the building foundation by the fasteners, wherein the mounting bracket can be retensioned by retightening the fasteners; the second holding member is secured to the mounting bracket flange; and the flexible sheeting connecting the first holding member to the second holding member to thereby create a continuous tensile load path between a top wall member of the building wall frame and the building foundation, and directs upward or lateral forces to the building foundation.

Another aspect of the invention is a single assembly unit of a structural fastening apparatus comprising a polymer article suitably configured and dimensioned to have a cross sectional profile of a first holding member, a second holding member, and a retaining member; a first structurally weakened section along the length of the article positioned between the first holding member and the second holding member; a second structurally weakened section along the length of the article positioned between the second holding member and the foundation mounting bracket, wherein the polymer article can be separated at the structurally weakened sections to yield separate assembly pieces.

A useful combination of the invention is a structural fastening apparatus kit comprising the flexible sheeting and single assembly unit described herein. Typically, the kit can include flexible sheeting that is pre-cut to a predetermined length and affixed to one of the first and second holding members or both at the top and bottom edge portions respectively.

Yet another embodiment of the invention is a method of making a structural fastening by providing a first holding member; providing a second holding member; providing a flexible sheeting having top and bottom edge portions; and attaching the first and second holding members to the flexible sheeting by wrapping the top and bottom edge portions of flexible sheeting around the first and second holding members respectively, optionally affixing the edge portions to the holding members with an adhesive, where the adhesive can be an adhesive tape such as a double sided tape or a glue or epoxy resin. Typically, the method further comprises providing a polymer article suitably configured and dimensioned to have a cross-sectional profile that includes that of the first holding member, the second holding member, and the retaining member; structurally weakening the section along its length in a plurality of locations including one positioned between the first holding member and the second holding member, and another positioned between the second holding member and the foundation mounting bracket, such that the polymer article can be broken along the structurally weakened sections to separate the first holding member, the second holding member, and the retaining member; and obtaining the first holding member, second holding member and retaining member by breaking the structurally weakened sections to provide the first holding member, second holding member and retaining member.

In addition, the invention also provides a method of securing the frame structure to the foundation which supports it, which comprises attaching the first holding member along a first edge of the flexible sheeting, attaching the second holding member along a second edge of the flexible sheeting, wherein the second edge is opposite the edge attached to the first holding member; providing a retaining member, wherein the retaining member is suitable for anchoring to the foundation of the frame structure; providing anchoring components suitable for anchoring to a foundation of a type used in the foundation of the particular structure; anchoring the retaining member to the foundation of the structure with the anchoring components suitable for anchoring the retaining member to the specific foundation; securing the first holding member to an upper portion of a framing member of the particular structure; and securing the second holding member to the retaining member anchored to the foundation of the particular structure.

BRIEF DESCRIPTION OF THE DRAWINGS

A preferred embodiment of the present invention, which is illustrative of the best mode contemplated by the applicants, is presented in the drawings and detailed description that follows herein.

DETAILED DESCRIPTION OF THE INVENTION

Figure 1:
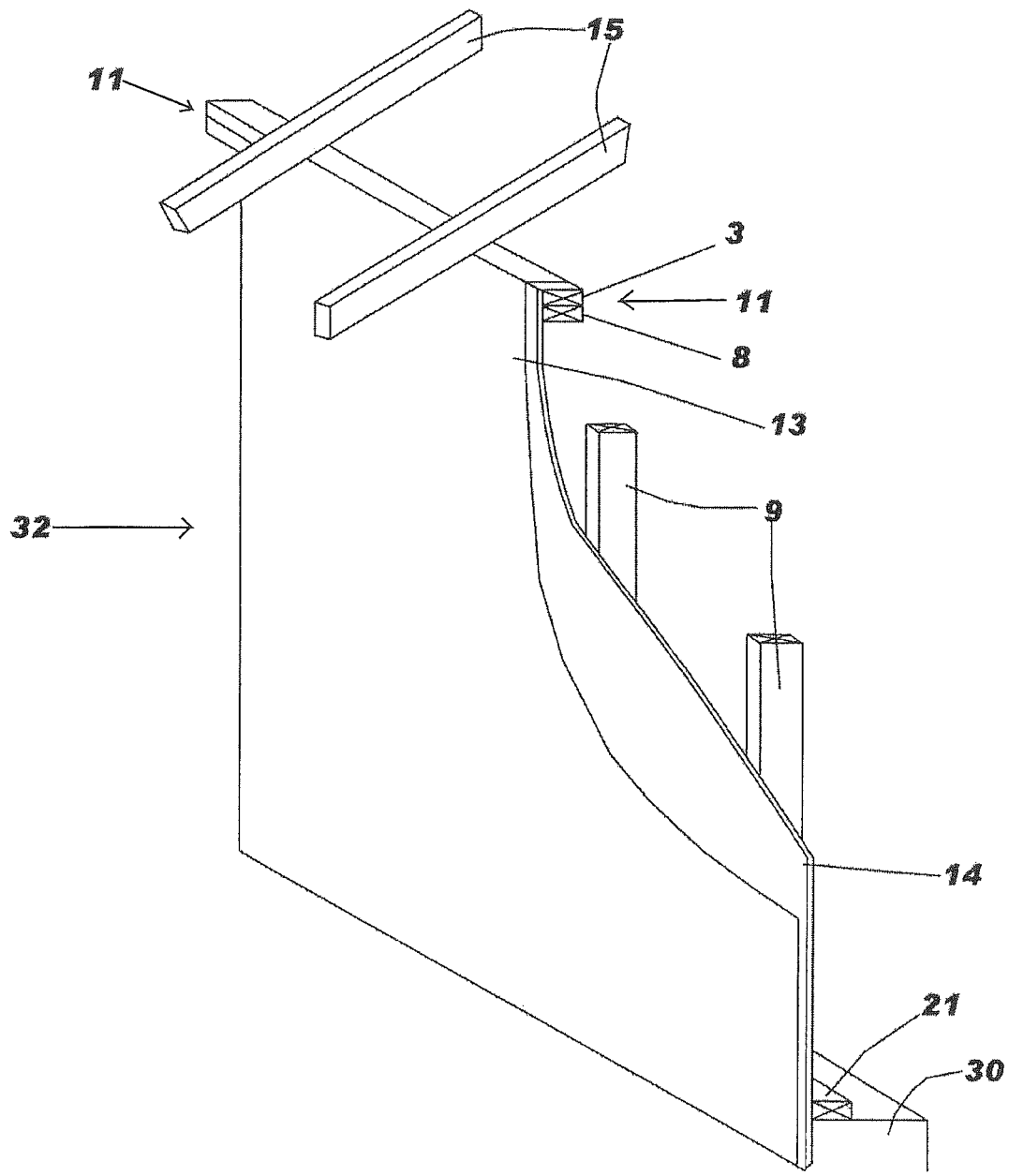
FIG. 1 shows a perspective view of a frame structure's wall members, sheathing and foundation with house wrap on the exterior side of the stud wall.

The following description, without limiting the scope of the invention, shall refer to the invention as set forth in the drawings.

The preferred embodiments shown in the drawings are an apparatus for a wind resistant system and fasteners for securing a roof structure of a building to the means for supporting said roof structure, comprising a vertically securing mechanism disposed adjacent to the means and operatively connecting the roof structure and the means for supporting. It serves as an auxiliary fastener connecting the roof of the structure to the foundation. The mechanism for securing utilizes a flexible sheeting that can be a composite fabric to facilitate that securing. The composite fabric which combines an underlying fabric or paper which has properties of water hold-out, wind hold-out and the ability to allow moisture to escape from the inside of the structure upon which it has been installed with a scrim layer that provides higher tensile strength than the fabric or paper alone. This composite fabric has an underlying fabric or paper with the properties of house wrap. Upon this underlying fabric is applied a network of threads comprising low elongation high strength threads in the vertical installed direction (machine direction), and perpendicular to the vertical threads (horizontally installed) higher elongation high strength threads. Threads can also be disposed in the diagonal mode in addition to disposal in the vertical and horizontal modes. This network of threads is attached to the underlying fabric or paper resulting in high tensile strength properties married to the underlying fabric or paper. These high tensile strength properties afford the composite fabric the ability to provide a continuous load path. These high tensile strength properties afford the composite fabric with resistance to penetrating forces. Together with the attaching mechanisms, the composite fabric yields a system which provides benefits to a structure by means of providing a series of high strength threads which together provide a continuous load path, and thus providing benefits to that structure in high wind events and benefits to that structure in seismic events. The invention as a whole is a plurality or combination of mechanisms, parts and systems that yield an overall system which provides a structure, benefits and levels of protection against certain hazards which are present in high wind and seismic events. The plurality or combinations of mechanisms, parts and systems help provide, inter alia, a structure with a continuous load path, resistance to uplift, resistance to penetrating forces, resistance to overturning, resistance to racking, resistance to structure sliding, water hold-out, wind hold-out, and the ability to allow moisture to escape from the inside of the structure.

Figure 16:
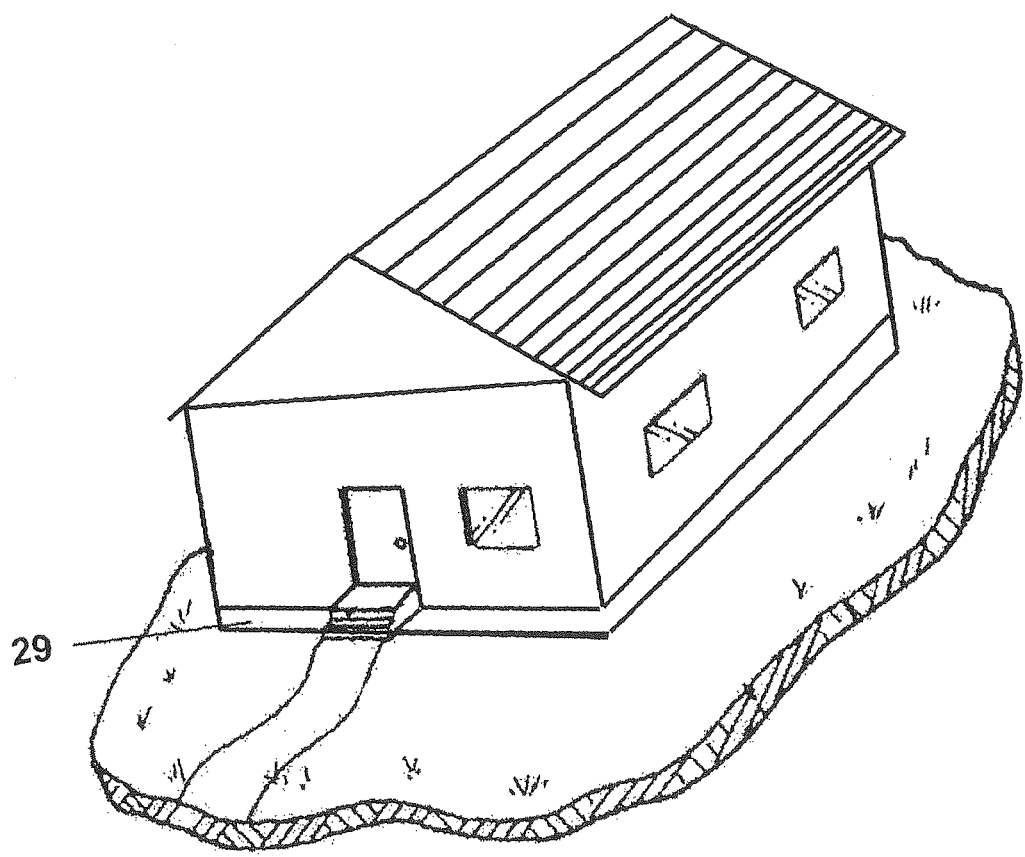
FIG. 16 shows a perspective view displaying a frame structure on a slab having a plurality of external walls supporting a roof.

The present invention is a structural fastening apparatus that aids in securing the roofing members and/or wall members of a frame structure to the structure's foundation. FIG. 1 shows a standard wall 32 of a frame structure, also referred to as a stud wall, resting on a foundation 30. A slab 29 may also be used in place of a foundation, as shown in FIG. 16. The stud wall 32 is made of a sill plate 21 resting on and anchored to the foundation 30, and forming the base of the stud wall 32. The wall studs 9 are nailed to the sill plate 21 at the bottom and the top plates 11 at the top of the wall. The top plates include an upper top plate 3 and a lower top plate 8. Sheathing 14 is nailed to the studs 9, top plates 11 and sill plate 21. The rafters 15 rest on and are nailed to the top plates 11. A house wrap 13 is typically wrapped horizontally around the exterior stud walls 32 to prevent wind and water infiltration while allowing moisture to pass through. The various embodiments of the structural fastening apparatus are installed on such a structure to reinforce it against upward and lateral forces, and help the roof and walls resist high winds and seismic events by providing a continuous load path from the upper portions of the structure to the foundation. A composite fabric of the present invention replaces the typical house wrap.

The structural fastening apparatus comprises a first holding member, a second holding member a retaining member and a flexible sheeting. The first holding member can be a top mounting plate 2 or a truss mounting plate 35, which is affixed to an upper portion of a frame structure's exterior wall 32 or roof trusses 34. The second holding member is a foundation batten bar 5 that can be reversibly held by a flange of a retaining member, or may be a polymer batten strip. The retaining member can be a foundation mounting bracket 6, a brick ledge box mounting bracket 43, an angle bracket 19 or a polymer angle bracket 33. The flexible sheeting 1 is a composite fabric made of a mat layer that provides protection against wind and water infiltration while allowing vapor transmission, and one or more scrim layers that provides added tensile strength in one or more directions. Each of these components and their operative association are described in greater detail below.

An upper portion of a frame structure is defined as either the top plate(s) 11 forming a stud wall 32, or the upper portion of a wall's vertical face, or the roof trusses 34 and blocking 39 of a high heel truss roof, where such framing member(s) form the highest point to which a holding member may be affixed to the exterior frame wall.

Figure 2A:
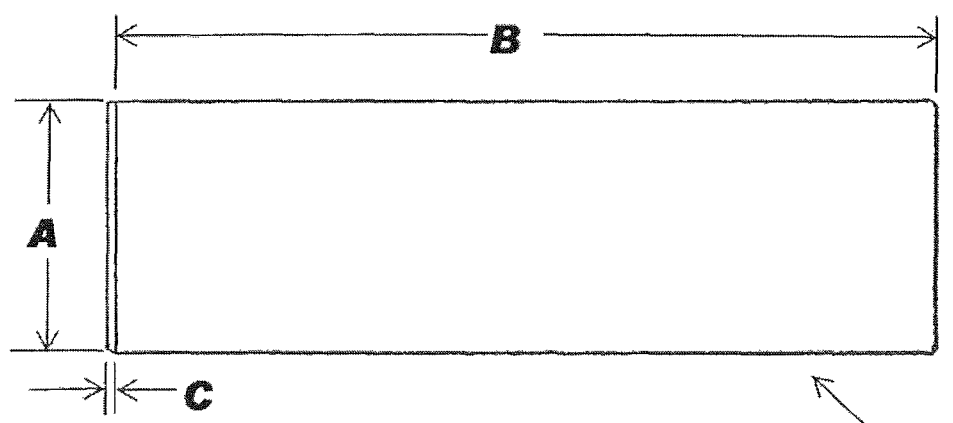
FIG. 2a shows a perspective view of a first holding member as represented by a top mounting plate.
Figure 2B:
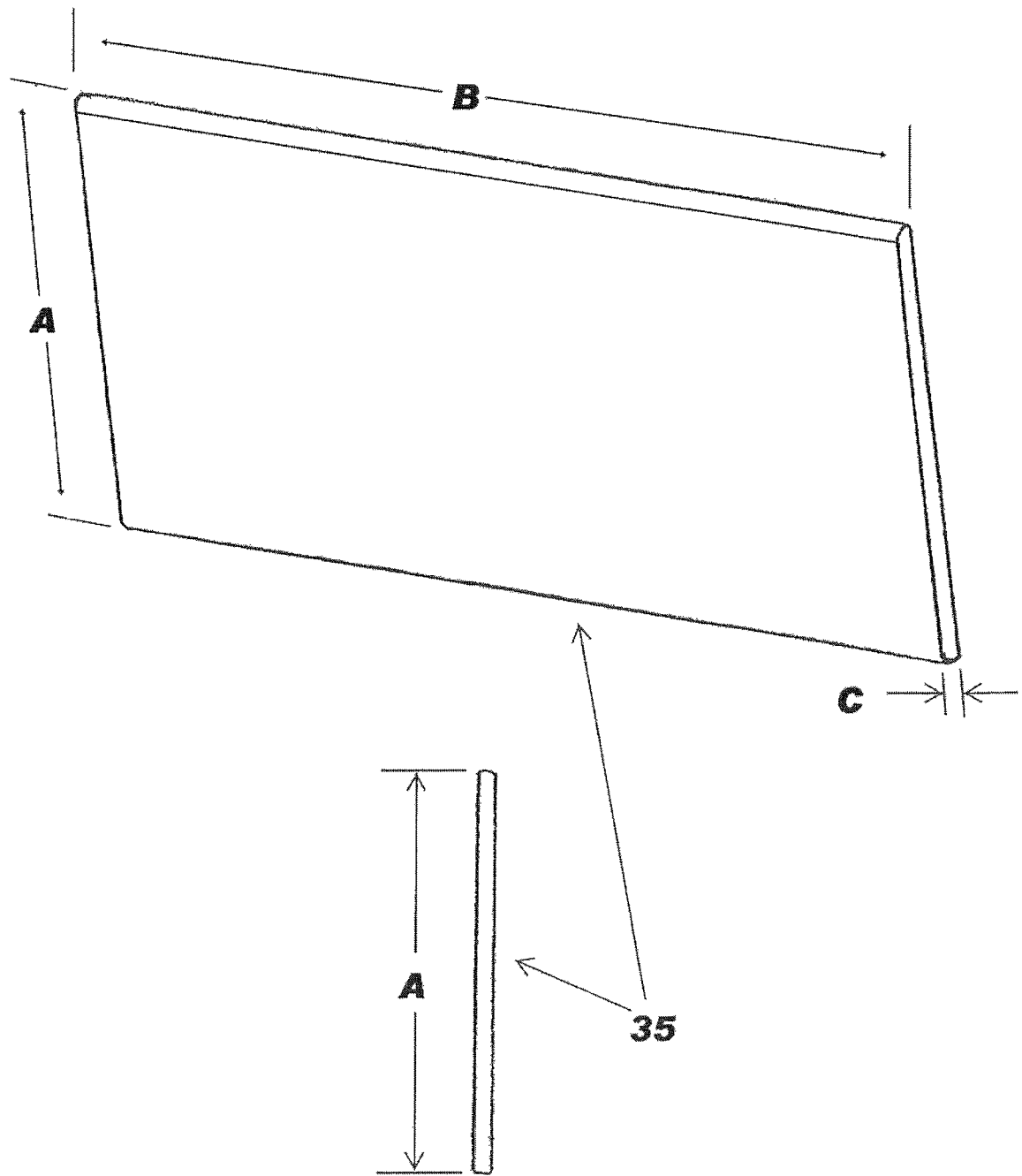
FIG. 2b shows a perspective and profile view of a first holding member as represented by a truss mounting plate.

The first holding member 2, as shown in FIGS. 2a and 2b, is preferably a flat plate configured and dimensioned to attach to an upper portion of a frame structure such as stud wall top plates, an exterior wall face, or roof trusses and blocking, that securely fastens an edge of the flexible sheeting to the particular upper portion of the frame structure.

In one embodiment the first holding member is a top mounting plate, as shown in FIG. 2a, configured and dimensioned to cover the upper top plate 3 of a stud wall 32 without extending beyond the end or edges of the stud wall. The top mounting plate 2 preferably has a first dimension A of between 2 and 9 inches, more preferably between 3 and 5½ inches, and most preferably approximately 3½ inches. The top mounting plate preferably has a second dimension B of between 4 and 10 feet, more preferably the top mounting plate has a second dimension that is between 7½ and 9½ feet, where most preferably the top mounting plate has a second dimension that is about 6 inches less than the width of the flexible material to which it is being attached. The top mounting plate preferably has a third dimension C of between about 3/32 and 3/8 of an inch, and more preferably between 1/8 and 1/4 inches, and most preferably about 1/8 of an inch.

The top mounting plate 2 is preferably mechanically affixed to the top of a framed stud wall 32 with mechanical fasteners. In the preferred embodiment, the top mounting plate 2 is affixed to the top of a stud wall 32 with nails 7 that are set vertically through the top mounting plate 2, an upper top plate 3, a lower top plate 8 and into the vertical studs 9 of the stud wall 32, as required by local building codes. The top mounting plate 2 is preferably affixed using two 16-penny nails 7 per stud as typically done to secure the two top plates 11 to the wall studs 9 in the normal practice of the industry and known to those of ordinary skill in the art.

In another embodiment, the top mounting plate 2 may also be mechanically affixed to the side or exterior face of a framed stud wall 32 with mechanical fasteners, where the mounting plate is parallel with the stud wall top plates. In this embodiment, the mounting plate can also be referred to as a side mounting plate 2, and has the same configurations, dimensions and construction as a top mounting plate.

The top mounting plate 2 is preferably made of a high strength polymer material such as ABS, PVC or other thermoplastics or engineering plastics common in the construction industry and known to those of ordinary skill in the art. When affixed to the top of the stud wall 32, the top mounting plate 2 should be made of a material that is tough enough for nails 7 to penetrate the mounting plate without causing it to fracture or otherwise be damaged. This is particularly important when there are no pre-made openings in the top or side mounting plate.

In an alternate embodiment, openings 18 may be pre-made in the top mounting plate 2, where the openings are suitably spaced apart to permit fasteners to align with wall studs and pass through the mounting plate without creating holes or possibly causing damage to the mounting plate.

In another preferred embodiment, the first holding member is a truss mounting plate 35 configured and dimensioned to attach to the roof trusses 34 and blocking 39 along most of the length of the flexible sheeting. The truss mounting plate 35, as shown in FIG. 2b, preferably has a first dimension A of between 2 and 11 inches, more preferably between 3 and 9 inches, and most preferably approximately 6 inches. The truss mounting plate 35 preferably has a second dimension B of between 4 and 10 feet, more preferably the top mounting plate has a second dimension that is between 7½ and 9½ feet, where most preferably the top mounting plate has a second dimension that is 6 inches less than the width of the flexible sheeting material 1 to which it is being attached. The truss mounting plate 35 preferably has a third dimension C of between about 3/32 and 3/8 of an inch, and more preferably between 1/8 and 1/4 inches, and most preferably about 3/16 of an inch. The truss mounting plate 35 is preferably made of a high strength polymer material such as ABS, PVC, HDPE or other thermoplastics or engineering plastics common in the construction industry and known to those of ordinary skill in the art. When affixed to the top of the stud wall 32, the truss mounting plate 35 should be made of a material that is tough enough for nails 36 to penetrate the truss mounting plate without causing it to fracture or otherwise be damaged. This is particularly important when there are no pre-made openings in the top or side mounting plate.

In an alternate embodiment, openings 18 may be pre-made in the truss mounting plate 35, where the openings are suitably spaced apart to permit fasteners to align with wall studs and pass through the mounting plate without creating holes or possibly causing damage to the mounting plate.

Figure 3:
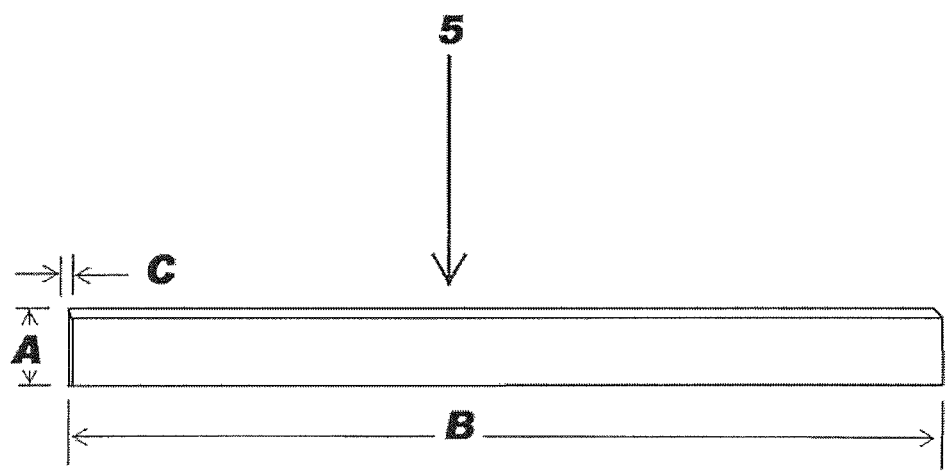
FIG. 3 shows a perspective view of a second holding member as represented by a foundation batten bar.

The second holding member, as shown in FIG. 3, is preferably a foundation batten bar 5 that is configured and dimensioned to be held securely by the foundation mounting bracket 6 in a flange 64. The foundation batten bar 5 preferably has a first dimension A of between 5/8 and 1½ inches, more preferably between 3/4 and 1¼ inches, and most preferably approximately 1 inch. The foundation batten bar 5 preferably has a second dimension of between 4 and 10 feet, more preferably the foundation batten bar 5 has a second dimension B that is between 7½ and 9½ feet, where most preferably the foundation batten bar 5 has a second dimension that is 6 inches less than the width of the flexible material to which it is being attached. The foundation batten bar preferably has a third dimension C of between about 3/32 and 3/8 of an inch, and more preferably between 1/8 and 1/4 inches, and most preferably about 1/8 of an inch. The top mounting plate is preferably made of a high strength polymer material such as ABS, PVC or other thermoplastics or engineering plastics common in the construction industry and known to those of ordinary skill in the art.

A preferred form of batten strip is one which is manufactured by the Buildex division of OMG, which is made from a polyolyfin resin.

Figure 4A:
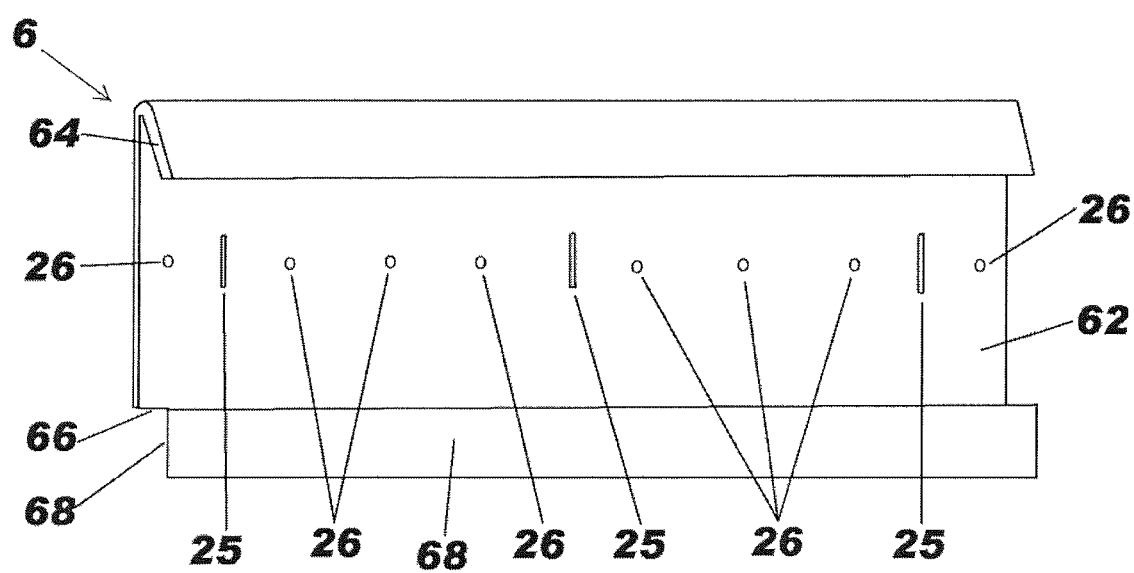
FIG. 4a shows a perspective view of a retaining member as represented by a foundation mounting bracket.
Figure 4B:
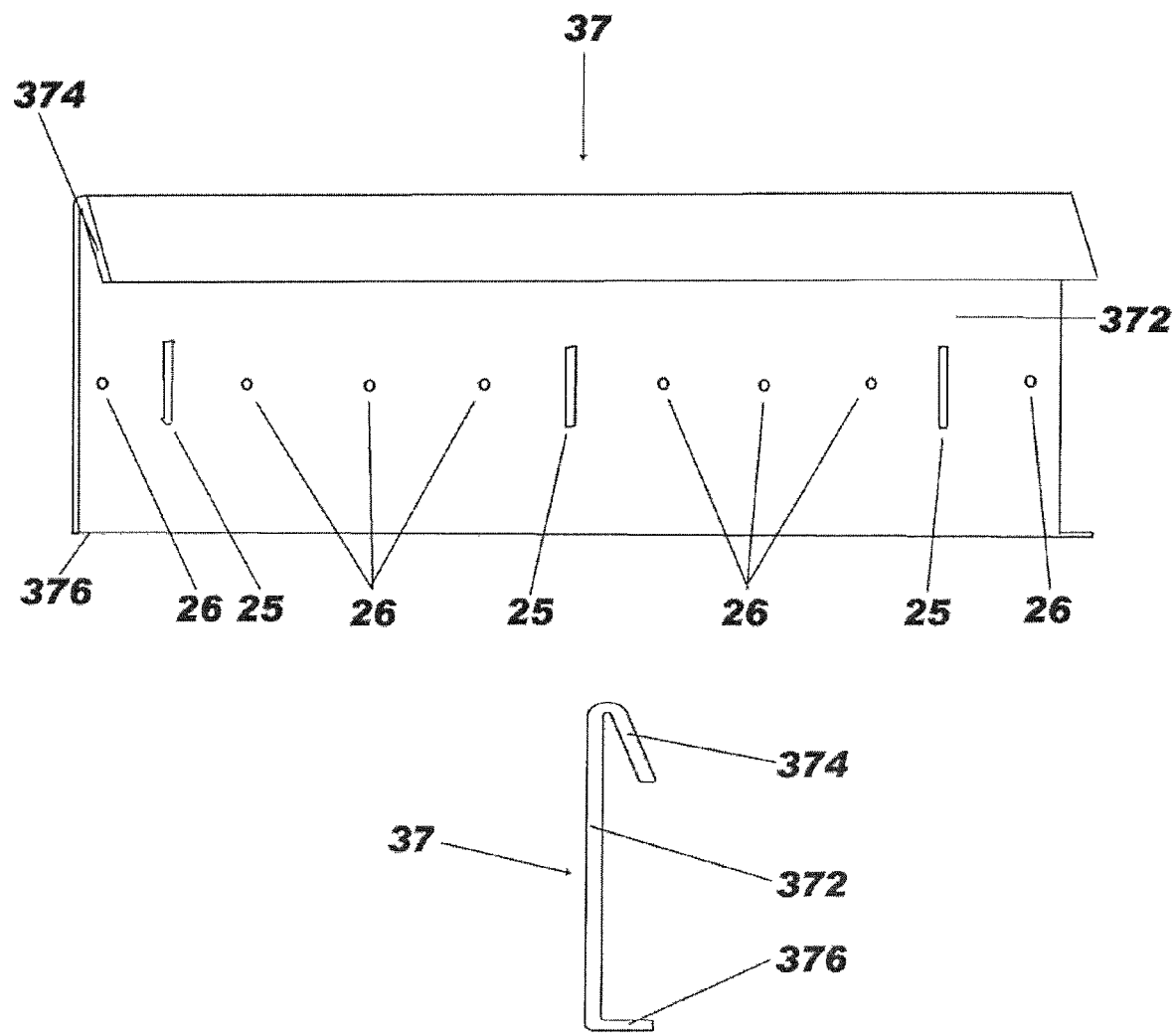
FIG. 4b shows a perspective and profile view of a retaining member as represented by a foundation mounting bracket with out a skirt.

The retaining member in a first embodiment is preferably a foundation mounting bracket 6 as shown in FIG. 4a. The foundation mounting bracket 6 is preferably configured to have a flat central portion 62, a first edge portion bent back towards the central portion to thereby form a top flange 64 having acute angle of between 10 and 25 degrees or preferably about 15 degrees between the top flange 64 and the central portion 62, and a second edge portion extending approximately perpendicular to the central portion with a second bend approximate 90 degrees away from the central portion, such that the second edge portion forms a step ledge 66 with a skirt 68. The top flange 64 is configured and dimensioned and the degree of the acute angle is selected to retain the second holding member, when the structural fastening apparatus is correctly installed. The tension on the second holding member when properly installed holds the second holding member reversibly in the angle between the top flange 64 and the flat central portion 62. The top flange 64 preferably has a dimension of between ½ and 1¼ inches between the bend with the central portion 62 and the front edge of the top flange 64, and more preferably between 7/8 and 1⅛ inches, and most preferably about 1 inch. The central portion 62 of the foundation mounting bracket 6 is preferably between about 2 and 6 inches, more preferably between 3 and 5 inches and most preferably 4⅛ inches from the first edge portion to the second edge portion. The step ledge 66 preferably has a dimension of between about 3/8 and 1 inches, more preferably between 3/8 and 9/16 inches, and most preferably about 7/16 inches. The skirt 68 of the step ledge preferably has a dimension of between about ½ and 1½ inches, more preferably between ¾ and 1¼ inches, and most preferably about 1 inch.

The second edge portion forming the step or ledge is configured and dimensioned to provide a surface for applying a downward force to increase the tension of the flexible sheeting for the purpose of post-load retensioning and bolt retightening. The downward force for retightening can preferably be applied by one or more individuals stepping upon the step or ledge while the securing bolts are retightened.

The foundation mounting bracket 6 preferably has a second dimension B of between 4 and 10 feet, more preferably foundation mounting bracket 6 has a second dimension that is between 7½ and 9½ feet, where most preferably the foundation mounting bracket 6 has a second dimension that is 6 inches less than the width of the flexible material to which it is being attached. The foundation mounting bracket 6 preferably has a third dimension C of between about 3/32 and 3/8 of an inch, and more preferably between 1/8 and 1/4 inches, and most preferably about 1/8 of an inch. The foundation mounting bracket is preferably made of a high strength polymer material such as ABS, PVC or other thermoplastics or engineering plastics common in the construction industry and known to those of ordinary skill in the art.

The central portion 62 preferably has one or more openings configured and dimensioned to allow suitable fasteners to pass through the openings and secure the foundation mounting bracket to a foundation. The openings are preferably round holes 26 or elongated slots 25, and more preferably a combination of both round holes 26 and elongated slots 25 suitable for allowing both repositioning of the foundation mounting bracket and retensioning of the flexible sheeting, and quasi-permanent fixing at a final position. The slots preferably are about ¾ to 2 inches in length, and the holes are preferably about 7/16 of an inch in diameter. The suitable masonry fasteners used to affix the foundation mounting bracket 6 to a foundation are preferably anchor 20 and/or bolts 17 known to those of ordinary skill in the art, e.g. Tapcon® Bolts and Redi-Drive® Anchors. In a preferred embodiment, the foundation mounting bracket 6 at its central portion has eight (8) round pre-made holes 26 for the Redi-Drive® anchors and three (3) pre-made slots 25 for the Tapcon® bolts.

In an optional embodiment of the foundation mounting bracket 6, at its central portion has less than eight (8) pre-made holes 26 for the Redi-Drive® anchors and three (3) pre-make slots 25 for the Tapcon® bolts.

In another optional embodiment of the foundation mounting bracket 6, the skirt 68 of the step ledge may be omitted, thereby providing a foundation mounting bracket with out skirt (wos). The other dimensions of the foundation mounting bracket would otherwise remain the same.

Figure 4C:
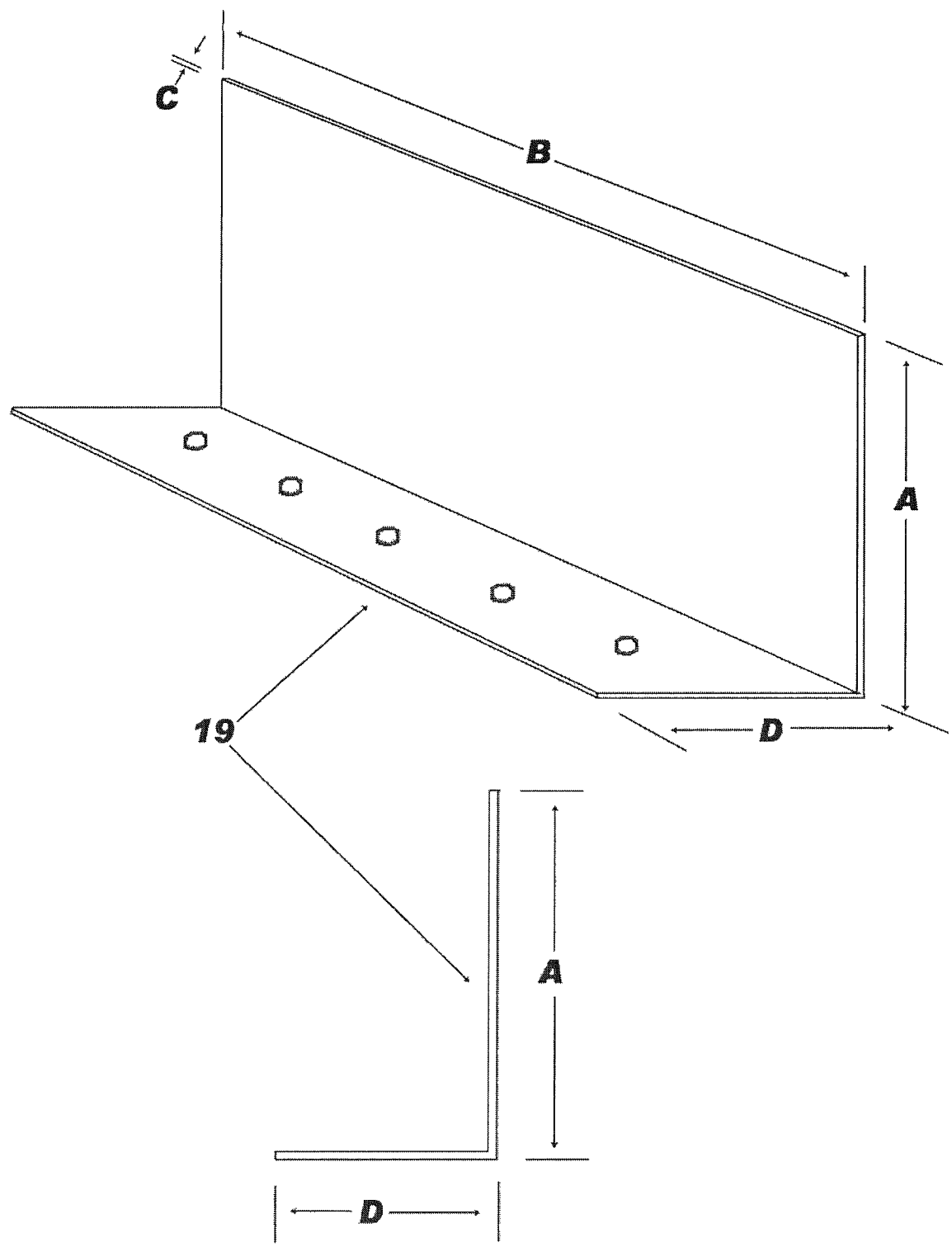
FIG. 4c shows a perspective and profile view of a retaining member as represented by an angle bracket.

The retaining member in a second embodiment is preferably an angle bracket 19, as shown in FIG. 4c. The angle bracket 19 is preferably configured to have an L-shape with a first leg of the L preferably having a dimension A of between about 3½ and 4½ inches from the bend to the top edge of the angle bracket 19, and more preferably having a dimension of about 4 inches. The second leg of the L preferably has a dimension D of between about 2 and 3 inches from the bend to the front edge of the angle bracket, and more preferably having a dimension of about 2 inches. The angle bracket 19 preferably has a second dimension B of between about 4 and 10 feet, more preferably the angle bracket 19 has a second dimension that is between 7½ and 9½ feet, where most preferably the angle bracket has a second dimension that is 6 inches less than the width of the flexible material to which it is being attached. The angle bracket 19 preferably has a third dimension C of between about 3/32 and ⅜ of an inch, and more preferably between ⅛ and ¼ inches, and most preferably about ⅛ of an inch. The angle bracket is preferably made of a high strength polymer material such as ABS, PVC or other thermoplastics or engineering plastics common in the construction industry and known to those of ordinary skill in the art.

Figure 4D:
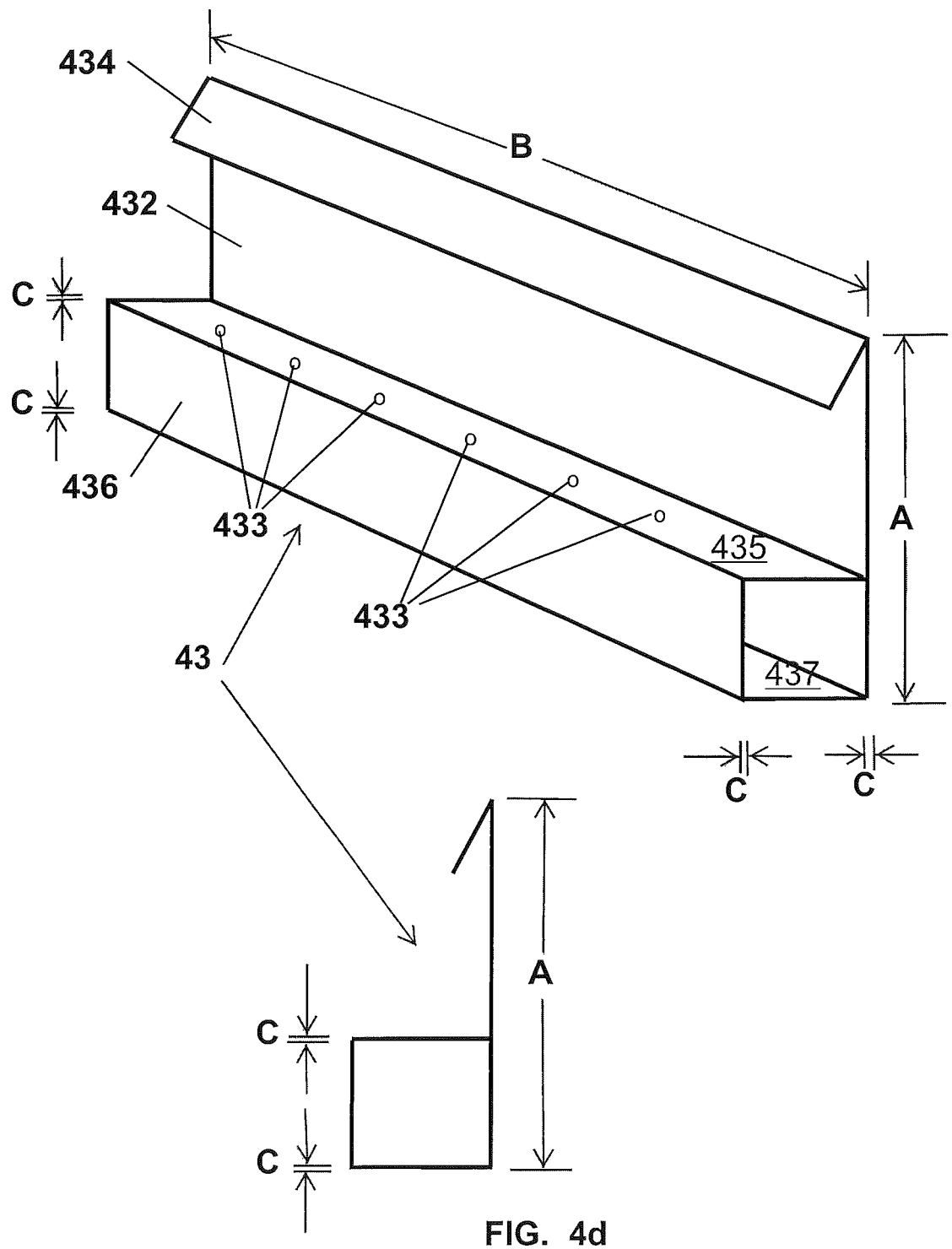
FIG. 4d shows a perspective and profile view of a retaining member as represented by a brick ledge mounting box.

The retaining member in a third embodiment is preferably a brick ledge box mounting bracket 43, as shown in FIG. 4d. The a brick ledge box mounting bracket 43 is preferably configured to have a flat central portion 432, a first edge portion angled back towards the central portion to thereby form a top flange 434 having acute angle between the flange and the central portion, and a box tube portion 436 extending from the central portion 432, wherein the central portion adjoins the box portion along a face of the box portion at a corner such that the central portion and box wall are flush and the box extends away from the central portion on the same side as the top flange. The top flange 434 is configured and dimensioned and the degree of the acute angle is selected to retain the second holding member, when the structural fastening apparatus is correctly installed. The top flange 434 preferably has a dimension of between ½ and 1¼ inches between the bend with the central portion and the front edge of the top flange. The central portion 432 of the brick ledge box mounting bracket 43 is preferably between about 2 and 9 inches, more preferably between 3½ and 6 inches and most preferably about 5 inches. The box tube portion 436 of the brick ledge box mounting bracket 43 is preferably between about 1 inch by 1 inch square and 3 inches by 3 inches square, and more preferably 2 inches by 2 inches square. The brick ledge box mounting bracket 43 preferably has a second dimension B of between about 4 and 10 feet, more preferably the brick ledge box mounting bracket 43 has a second dimension that is between 7½ and 9½ feet, where most preferably the brick ledge box mounting bracket 43 has a second dimension that is 6 inches less than the width of the flexible material to which it is being attached. The brick ledge box mounting bracket 43 preferably has a third dimension C of between about 3/32 and ½ of an inch, and more preferably between ⅛ and 7/16 inches, and most preferably about 5/16 of an inch. The brick ledge box mounting bracket 43 is preferably made of a high strength polymer material such as ABS, PVC or other thermoplastics or engineering plastics common in the construction industry and known to those of ordinary skill in the art.

The upper wall 435 of the box tube portion 436 forms a step or ledge configured and dimensioned to provide a surface for applying a downward force to increase the tension of the flexible sheeting for the purpose of post-load retensioning and bolt retightening. The downward force for retightening can preferably be applied by one or more individuals stepping upon the upper wall 435 of the box tube portion 436 while the securing bolts are retightened.

Openings 433 through the upper wall 435 and lower wall 437 of the box tube portion 436 are preferably placed about every 6 inches to allow mechanical fasteners such as bolts or anchors to pass vertically through the box tube portion 436 and fasten to the horizontal top face 22 of a foundation wall 30. The use of a box tube provides greater strength and rigidity than a single-walled L-shaped bracket. The mechanical fasteners may be extended length fasteners to provide a gap between the bottom surface of the mounting bracket and the upper surface 22 of a building foundation.

Figure 4E:
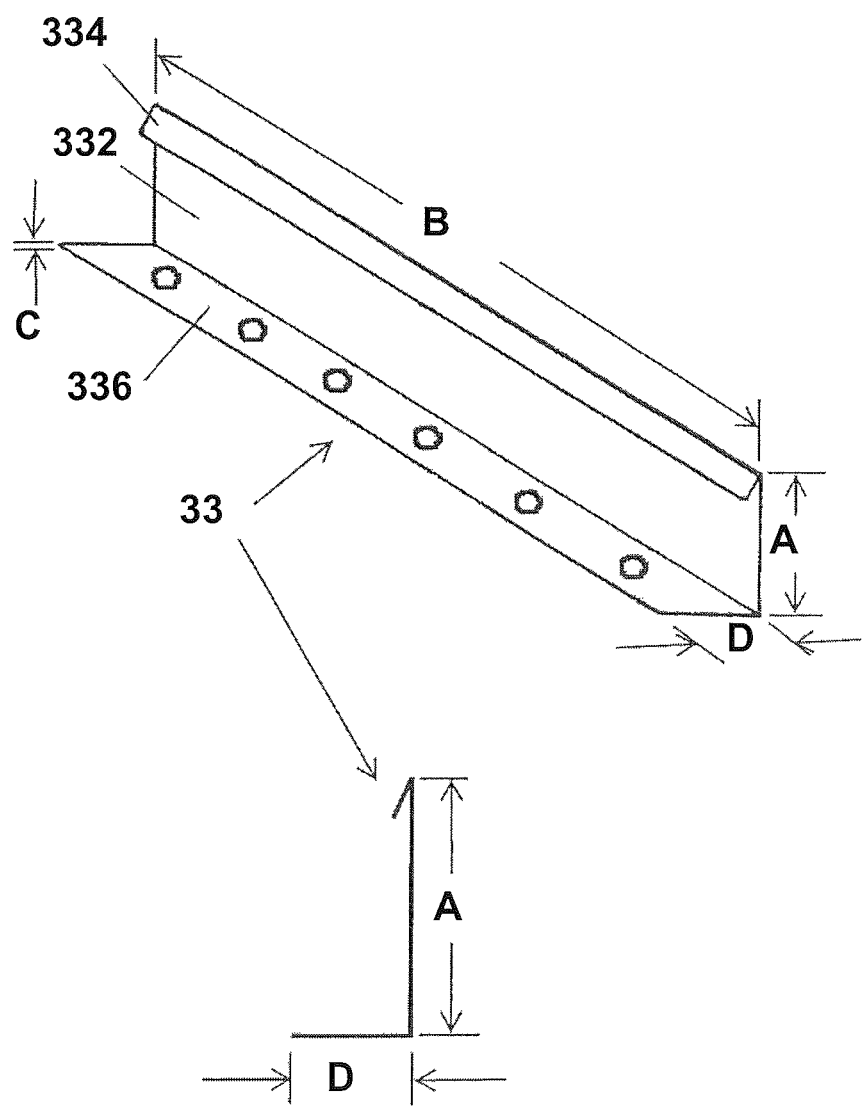
FIG. 4e shows a perspective and profile view of a retaining member as represented by a polymer angle bracket.

The retaining member in a forth embodiment is preferably a polymer angle bracket 33, as shown in FIG. 4e. The polymer angle bracket 33 is preferably configured to have an L-shape with a first leg or central portion 332 of the L 336 preferably having a dimension A of between about 3½ and 4½ inches from the bend to the bottom edge of the polymer angle bracket 33, and more preferably having a dimension of about 4 inches. The second leg of the L preferably has a dimension D of between about 2 and 3 inches from the bend to the front edge of the polymer angle bracket, and more preferably having a dimension of about 2 inches. The top flange 334 is configured and dimensioned and the degree of the acute angle is selected to retain the second holding member, when the structural fastening apparatus is correctly installed. The top flange 64 preferably has a dimension of between ½ and 1¼ inches between the bend with the central portion 332 and the front edge of the top flange 334, and more preferably between ⅞ and 1⅛ inches, and most preferably about 1 inch. The polymer angle bracket 33 preferably has a second dimension B of between about 4 and 10 feet, more preferably the polymer angle bracket 33 has a second dimension that is between 7½ and 9½ feet, where most preferably the polymer angle bracket has a second dimension that is 6 inches less than the width of the flexible material to which it is being attached. The polymer angle bracket 33 preferably has a third dimension C of between about 3/32 and ⅜ of an inch, and more preferably between ⅛ and ¼ inches, and most preferably about 3/16 of an inch. The polymer angle bracket 33 is preferably made of a high strength polymer material such as ABS, PVC or other thermoplastics or engineering plastics common in the construction industry and known to those of ordinary skill in the art.

All straps, clips and fasteners should be polymer materials or a corrosion resistant metal.

In a preferred embodiment, each of the components of the structural fastening apparatus are made as a single assembly unit 12 comprising an extruded polymer strip suitably configured and dimensioned to have a cross sectional profile of a first holding member, a second holding member, and a retaining member, wherein there is a first structurally weakened section along the entire length of the extruded polymer strip positioned between the first holding member and the second holding member, a second structurally weakened section along the length of the extruded strip positioned between the second holding member and the foundation mounting bracket, wherein the extruded polymer strip can be separated at the structurally weakened sections to yield three separate assembly pieces. Preferably, the structurally weakened section is a V-notch 23 that allows the components of the structural fastening apparatus to be detached from each other without damaging the separate components.

While the preferred embodiment fabricates all the structural fastening apparatus components as a single extruded polymer strip, a mounting bracket assembly 12, that can be separated to yield the three separate assembly pieces 2, 5 and 6; 2, 5 and 19; or 2, 5 and 33; the structural fastening apparatus components can also be fabricate separately as individual components.

The invention also relates to a kit comprising either a single assembly unit of the components of the structural fastening apparatus, or the individual piece of the components of the structural fastening apparatus, plus the flexible sheeting to thereby provide a contractor or installer all the necessary parts to provide a continuous load path to secure the walls and roof of a frame structure to a foundation in one convenient collection. The structural fastening apparatus kit may also include all the necessary fasteners and adhesives to attach and secure the individual pieces to their respective adjoining pieces or to the framing members of the structure as further described herein, without requiring separately obtained components. In another embodiment, the kit may be pre-assembled, wherein the flexible sheeting is pre-cut to the required width and length and the first and/or second holding members are pre-attached to the flexible sheeting. The first and second holding members, the retaining member and flexible sheeting are then rolled up or folded into a convenient assembly for transport or shipping prior to installation. Polymer holding members are preferred for reducing the overall weight of the assembly to facilitate shipping an installation.

Figure 5A:
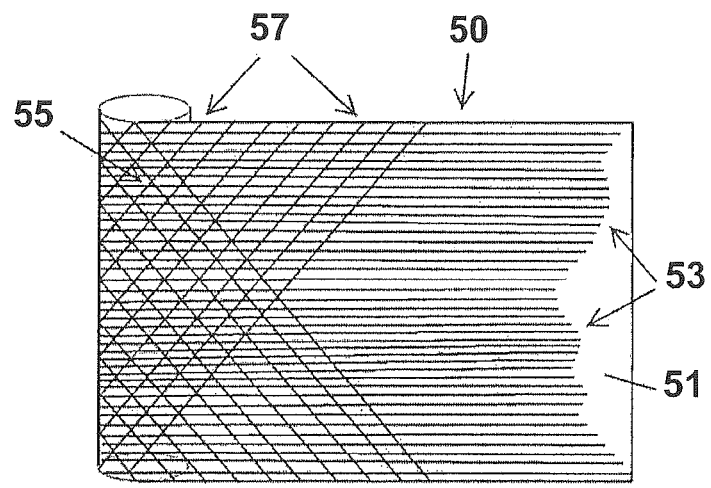
FIG. 5a shows a flexible sheeting having a mat layer and scrim layers with fibers running longitudinally and diagonally.
Figure 5B:
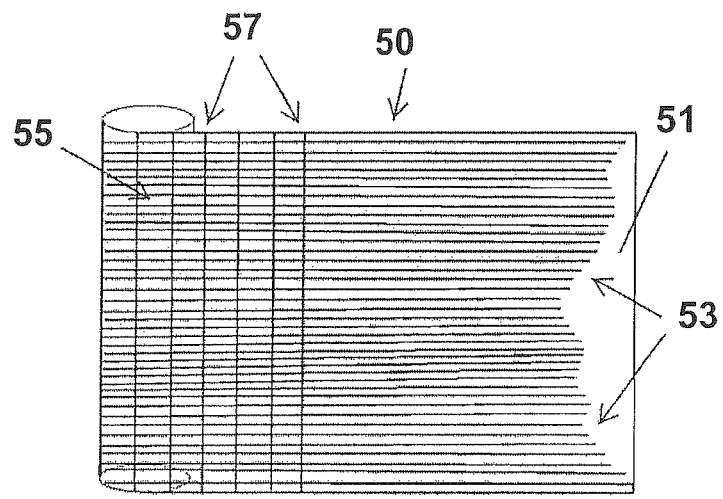
FIG. 5b shows a flexible sheeting having a mat layer and scrim layers with fibers running longitudinally and latitudinally.
Figure 6A:
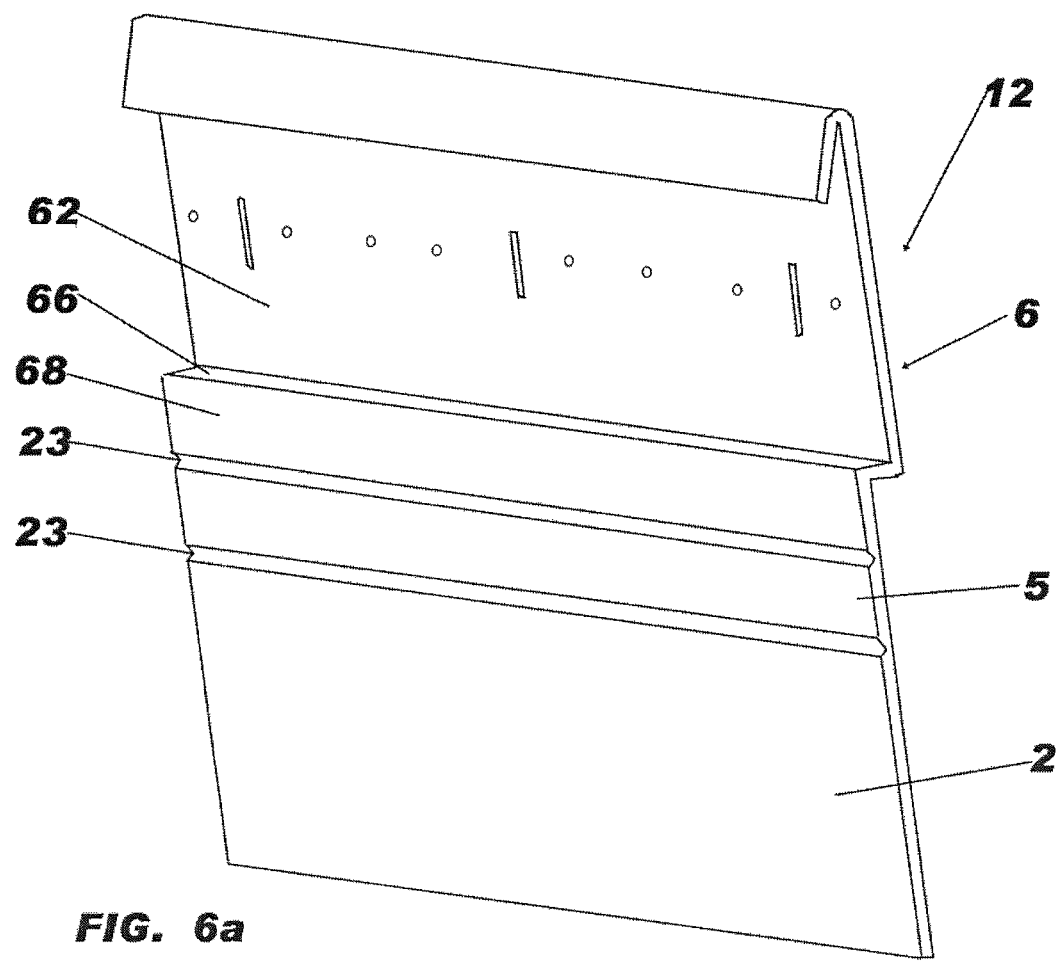
FIG. 6a shows a perspective view of a single extruded structural fastening apparatus assembly unit.
Figure 6B:
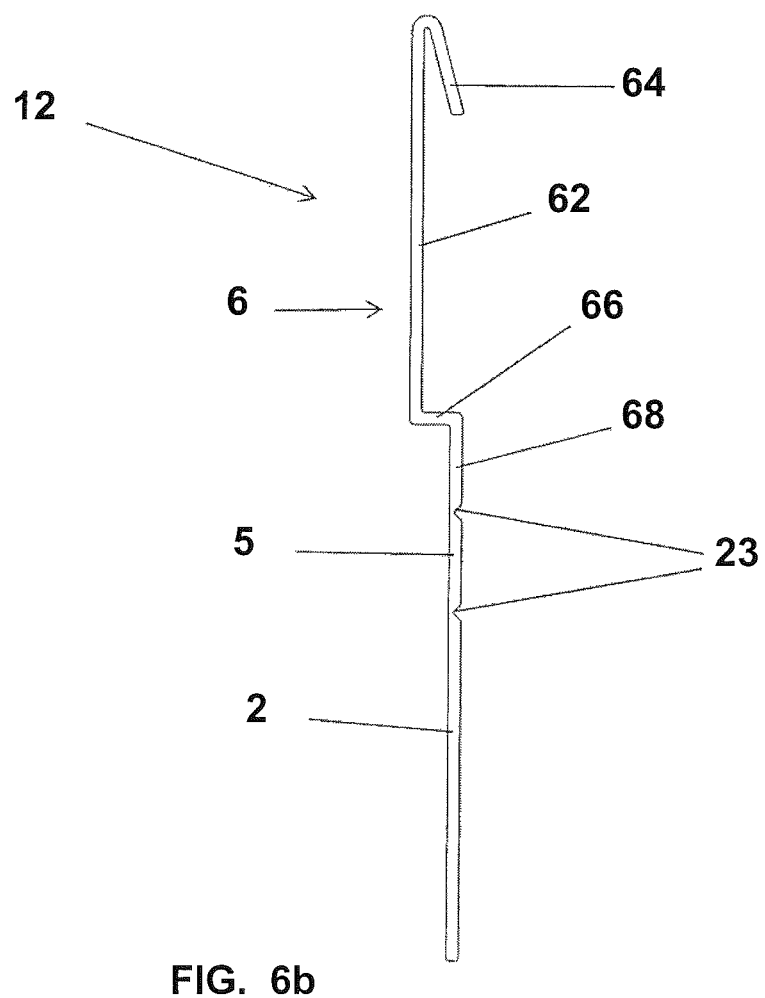
FIG. 6b shows a cross-section view of a single extruded structural fastening apparatus assembly unit.

The best mode of the invention contemplates the flexible sheeting 1 being a composite fabric 50 comprising a mat layer 51 that is vapor-permeable and one or more reinforcing layers 55 attached to the mat layer 51 to provide increased strength above that of the mat layer alone, as shown in FIGS. 5a and 5b. The reinforcing layer(s) are preferably scrim layers as that term is known and used in the art of fabrics. A preferred composite fabric of the type to be used in this invention is disclosed in Kohlman et al. U.S. Patent Application Publication 2007/0281562, the disclosure of which is expressly incorporated herein by reference. The mat layer 51 can be a non-woven material made of a polymer that prevents the infiltration of wind and water while being a vapor-permeable membrane. The moisture vapor transmission rate of the composite fabric is between about 5 and 20 perms, as determined by standard means in the industry. The primary direction of the composite fabric having the high tensile strength low elongation fibers has a dry tensile strength of 200 lbs or greater, while the cross direction of the composite fabric having the lower tensile strength higher elongation fibers has a dry tensile strength of 175 lbs or greater, as determined by standard means in the industry. The scrim layers' high tensile strength properties also afford the composite fabric resistance to penetrating forces. The high tensile strength fibers can resist various penetrating forces such as those considered in large missile impact testing as defined in standard building codes for high wind areas. The composite fabric also meets the required code for Grade D building paper, as determined by standard means in the industry.

The flexible sheeting preferably comes as a roll of material, where the width, or distance measured across the web herein referred to as the latitudinal direction, of the flexible sheeting can be between about 4 and 10 feet, and the length of flexible sheeting wound onto the roll, herein referred to as the longitudinal direction, is typically between about 100 and 111 feet, however other widths and length of flexible sheeting can be used without deviating from the spirit or intent of the invention. More preferably, the width of the flexible sheeting 1 is between 8 and 9 feet. The amount of flexible sheeting removed from a roll of material is of a length capable of extending from the upper anchoring location of the structure's frame to the lower anchoring position at the foundation wall 30, plus an additional length of material needed for affixing the flexible sheeting to the first holding member and the second holding member. The additional length in this longitudinal direction needed for attaching to a mounting plate 2, 35 and batten bar 5 is preferably about 20 inches. The high tensile strength low elongation fibers 53 are aligned with the longitudinal direction in which the flexible material is unrolled, and the lower tensile strength higher elongation fibers 57 are aligned in a direction that is either across the width of the roll perpendicular to the high strength fibers, as shown in FIG. 5b, and therefore in the latitudinal direction, or diagonally across the width of the roll at an angle to the high strength low elongation fibers 53 which are in the longitudinal direction, as shown in FIG. 5a. When the flexible sheeting 1 is unrolled in the longitudinal direction and vertically attached to a frame structure, therefore, the high tensile strength low elongation fibers 53 extend from the upper portion of the structure's frame to the foundation, and are aligned with and provide resistance to the expected lateral and upward forces. The lower tensile strength higher elongation fibers 57 would then be either horizontal or inclined diagonally in one or both directions across the fabric. The nature of the scrim layers of the composite fabric also provides a multitude of mini-load points across the length and width of the composite fabric. The closely spaced plurality of fibers or fiber bundles that form the network of strands of the scrim layers provide a continuous load path across the entire length and width of the composite fabric, and spreads any load out along the fabric rather than providing separate individual load points.

In this embodiment, a plurality of flexible sheetings 1 can be attached to a particular exterior face of the structure, where each of the attached sheets has a predetermined dimension that is preferably between 8 and 9 feet. The latitudinal dimension of the flexible sheeting may be less than the full length of the specific exterior face of the structure's wall. When the latitudinal dimension, or width, of the flexible sheeting 1 is less than the full length of a particular exterior face, two or more pieces of flexible sheeting should be used and each sheet should overlap the adjacent sheet(s) by approximately 6 inches or as required by local building codes. The seam between such adjacent sheets should be covered, preferably with a suitable adhesive tape. The flexible sheeting should cover the frame structure in a manner suitable to achieve a closed and continuous membrane around the structure to provide maximum protection against air and water infiltration, while providing proper moisture management. It should be recognized that the actual dimensions of a flexible sheeting 1 may be greater than the dimensions of some exterior faces of a structure, so that one pre-dimensioned sheet may be sufficient to entirely cover a particular exterior face of the structure while more than one pre-dimensioned sheet may be needed to completely cover other exterior faces of a structure without deviating from the spirit and intent of the present invention. In the preferred embodiment, the flexible sheeting provides the greatest strength to resist upward and lateral forces applied against the structure, when the sheeting is attached to and covers all the exterior faces of a structure.

One or more strips of the flexible sheeting can also be used to provide a continuous load path from the top of a stud wall or upper portion of a frame building to the foundation, where the strip(s) may be a plurality of separate strips or a single strip folded over one or more times. The one or more strips can also be of the composite fabric, or a composite fabric with an additional scrim layer or a plurality of additional scrim layers. The strips of flexible sheeting can also reinforce a layer of flexible sheeting or supplement the continuous load path. A strip has a length between four feet and 1 inch.

The first holding member, second holding member and retaining member all preferably have the same length, while the flexible sheeting is preferably either about 6 inches or 12 inches wider than the apparatus components to allow about 6 inches of overlap with adjacent sheeting on either or both sides.

In the preferred embodiment, the first holding member and second holding member are attached to the flexible sheeting with a suitable adhesive. The first holding member and second holding member should be coated with the suitable adhesive, and one edge of the flexible sheeting is wrapped around the first holding member and the edge opposite the first holding member is wrapped around the second holding member. Preferably additional adhesive is applied to the flexible fabric and the fabric is wrapped around a holding member three times. The flexible sheeting 1 is preferably wrapped around the second holding member in a clockwise fashion. Wrapping the flexible sheeting clockwise around the second holding member aids in reversibly securing the second holding member to the retaining member. Tension on the flexible sheeting will then hold the second holding member within the top flange of a foundation mounting bracket 64, Angle bracket or brick ledge box mounting bracket 434.

The best mode of the invention contemplates attaching a first holding member along one edge of the flexible sheeting where the high strength low elongation fibers terminate, and attaching the second holding member along the other edge of the flexible sheeting where the opposite ends of the high strength low elongation fibers terminate. Preferably, these are the top edge and bottom edge portions of the flexible sheeting, where the first holding member is attached along the top edge portion and the second holding member is attached along the bottom edge portion where the high strength low elongation fibers terminate. In this manner, the direction of the high strength low elongation fibers coincides with the direction from the first holding member to the second holding member, and therefore aligns the high strength low elongation fibers with the continuous load path when the first and second holding members are attached to the upper portion of an exterior wall of the frame structure and the building foundation respectively.

The implementation of the invention involves attaching the flexible sheeting along one edge to a first holding member and attaching the opposite edge of the flexible sheeting to a second holding member; mechanically affixing a first holding member to an upper portion of a stud wall 32 of a frame structure; mechanically affixing a retaining member to the structure's foundation; and securing the second holding member to the retaining member to provide a continuous load path from the upper portion of the frame structure to the foundation to resist upward and lateral forces.

In an alternate embodiment, the first holding member is mechanically affixed to an upper portion of a structure's wall and the second holding member is mechanically affixed directly to a lower portion of the structure's wall or to the foundation without the use of a retaining member affixed to the foundation to secure the second holding member. The second holding member would then be mechanically affixed to the wall or foundation after the framing and roofing is completed to avoid the need for post-load retensioning. This embodiment cannot be retensioned.

In this embodiment of the apparatus of the invention, each of the sheets of composite fabric 1 having been affixed to the top of the stud wall 32 is affixed or secured at its bottom end to the foundation 30 or slab 29 by gluing and wrapping said composite fabric 1 around a polymer batten strip 31 or other suitable batten strip or by use of the top mounting plates 2 which polymer batten strip 31 or top mounting plate 2 contains a plurality of holes disposed at a spaced distance along the length of said apparatus. Once the adhesive is applied to the apparatus, the composite fabric 1 is wrapped around the batten strip or top mounting plate, and then is pulled downward to cause the composite fabric 1 to become taut along its length. The polymer batten strip 31 or top mounting plate 2 is mechanically affixed to the top surface 22 of the foundation 30 or slab 29 by bolts 17 or other suitable fasteners with flanges or washers perpendicular to the face of the composite fabric 1, and through the plurality of holes in polymer batten strip 31 or top mounting plate 2 along its face.

The preferred embodiments of the invention relates to the means and systems to keep a structure and its roof in place during a high wind event. It also relates to helping keep the structure on its foundation 30 and its roof in place during a seismic event. It relates to providing a continuous load path transferring the uplift load from the roof structure down to the foundation 30. It utilizes the composite fabric 1 to affix from a raised or high heel roof truss and to its blocking and sheathing 34, down to the foundation 30 of the structure. It utilizes an attachment system which provides the ability to re-tension or post load re-tension the composite fabric 1 once the roof loading is in place. It also utilizes an attachment system which provides the ability to install on a brick ledge 22 for brick veneer applications with a post-load or re-tightening capability. This system provides a continuous load path which transfers the vertical or upward loads down to the structure's foundation 30. It does so by utilization of a Composite Fabric 1 and a high heel truss mounting plate 35, and either its angle bracket 19, or its polymer angle bracket 33, or its mounting bracket assemblies 12, or the individual parts which constitute the mounting bracket assemblies 12, or its foundation mounting bracket 6, its foundation batten bar 5, or its top mounting plate 2, or its foundation mounting bracket wos 37. This affords the structure of the benefit of utility and economy of utilization of composite fabric 1 and its attachment parts, and its associated labor, to accomplish continuous load path benefits, to accomplish seismic benefits, to provide resistance to overturning, to provide resistance to racking, to provide resistance to structure sliding, to provide water hold out, to provide vapor management and to provide an air barrier.

Figure 7:
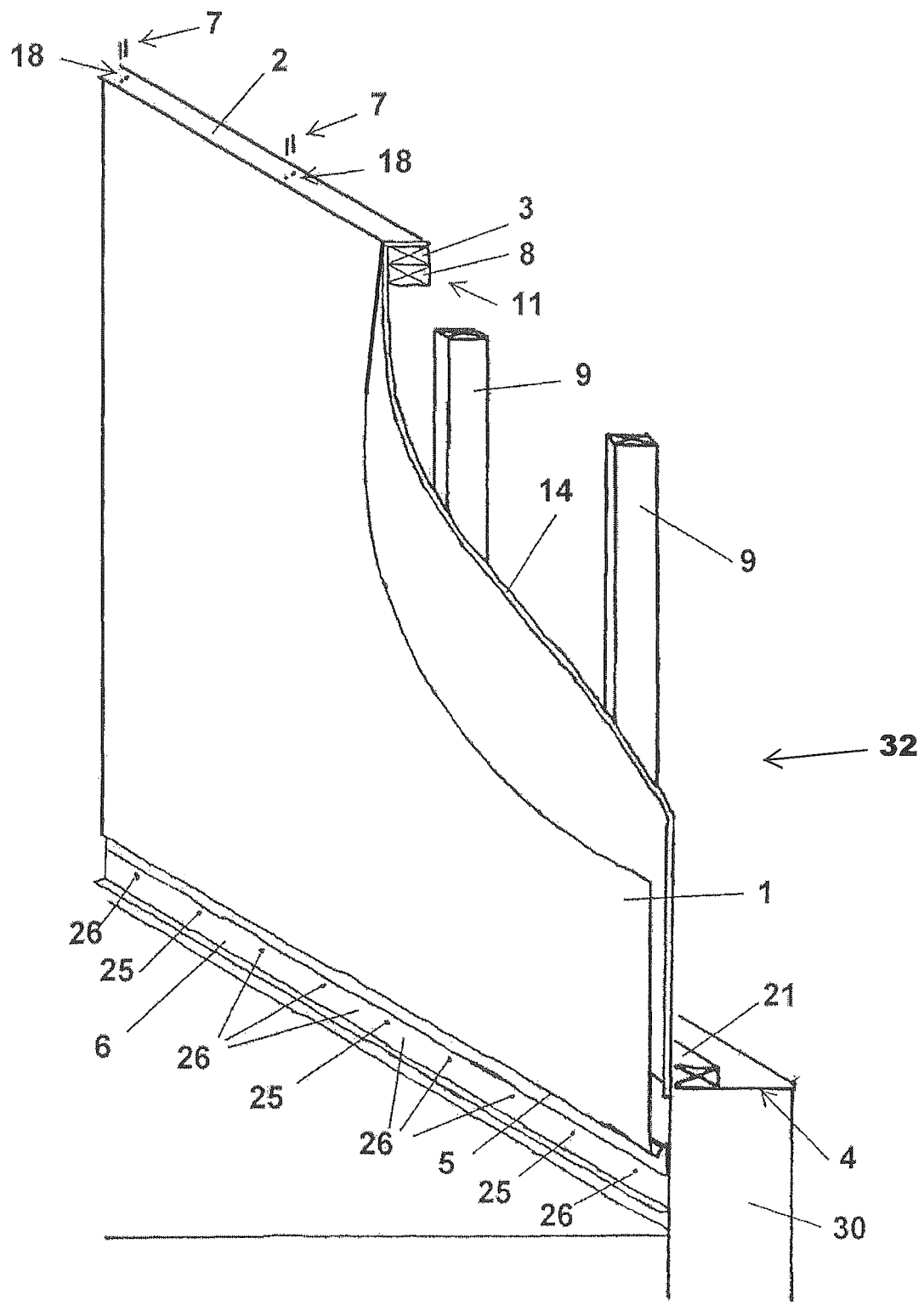
FIG. 7 shows a perspective view of a first embodiment of the invention implementing a top mounting plate.

In the embodiment shown in FIG. 7, a first holding member, the top mounting plate 2, is attached to a flexible sheeting 1, and is mechanically affixed to the top plates 11 and studs 9 of a stud wall 32. The flexible sheeting extends from first holding member affixed to the upper portion of the stud wall 32 vertically to the lower portion of the stud wall comprising the foundation 30 on the exterior side of the stud wall adjacent to the sheathing 14. A second holding member, foundation batten bar 5, is attached to the lower end of the flexible sheeting and is secured to the retaining member, the foundation mounting bracket 6.

If the roofing members 15 were previously attached to the top plates 11 to prevent access to the length of the top plates, the first holding member should be mechanically affixed to the vertical face of the wall. The first holding member would be mechanically affixed to the edges of the top plates 11, the wall studs 9 and the sheathing 14, as required by building codes and sound engineering practice.

The best mode of the invention contemplates placement of the flexible sheeting, which can be a composite fabric, on the outside face of a structure's wall framing members and sheathing for resisting movement of the wall in the direction that exerts tensile stresses in the film/fabric and would otherwise stretch the film/fabric, i.e. inwards, due to the film's/fabric's low elongation and high tensile strength properties in the load direction from the foundation to the upper framing members of a wall or roof trusses 34.

Seismic events also can cause a frame structure to move laterally and possibly become displaced from the foundation wall. Placement of the flexible sheeting/composite fabric on the outside of the structure's wall framing members and sheathing with the high tensile strength low elongation fibers in the vertical direction from the foundation to the upper portion of the frame structure such as a stud wall, or roof trusses 34 and blocking 39, aids in preventing such lateral motion and displacement by anchoring the structure's frame in a specific position and restricting the amount of movement the frame may undergo from the specific position due to lateral forces.

In another embodiment, one or more polymer batten strips 31, or an additional scrim layer or a plurality of scrim layers, may also be affixed on either side of openings in a frame structure to reinforce the flexible sheeting 1 and augment the continuous load path where such an opening prevents the flexible sheeting from extending continuously from foundation 30 to the upper portion of the frame structure along an exterior frame wall and interrupts the load path from the foundation to the upper portion of a frame structure. The polymer batten strip 31, or additional scrim layer or a plurality of scrim layers, is preferably operatively connected to a roof structure and a foundation on the exterior of a stud wall on either side of an opening that interrupts the flexible sheeting and load path, such as window or door openings. The polymer batten strip 31, or additional scrim layer or a plurality of scrim layers, also secures and reinforces the flexible fabric 1 at such openings.

A polymer batten strip is preferable ½ to 2 inches in width, and more preferably about ¾-1 inches in width.

The additional scrim layer(s) may be separate scrim layers or a single scrim layer folded over one or more times to provide a plurality of scrim layers. The additional scrim layers or additional flexible sheet layers reinforce the initial flexible sheeting at the one or more openings framed into the frame wall to create a reinforced load path from the upper top plate or upper portion of the frame wall to the foundation.

An example of a preferred embodiment of the invention, as shown in FIG. 7, has a sheet of composite fabric 1 wrapped around and adhered to a top mounting plate 2, with an adhesive that is applied to the top mounting plate 2 and a portion of the edge of the composite fabric 1 sufficient to wrap the composite fabric around the top mounting bracket three (3) times, so that the composite fabric is securely attached to the top mounting plate 2. The wrapped top mounting plate is then mechanically affixed with suitable nails 7 to the top plates 11 of the stud wall 32. The top mounting plate 2 and composite fabric 1 are specifically affixed to the upper top plate 3, the lower top plate 8 and each of the studs 9 comprising the stud wall 32 by two (2) 16 penny nails 7 per stud 9, or fasteners of a size and makeup as is required by building code or is the practice within the building community, while still consistent with the required engineering aspects.

The edge of the composite fabric 1 opposite the top mounting plate 2 is wrapped around a foundation batten bar 5 three (3) times clockwise and attached using an adhesive in the same manner as described for the top mounting bracket. The wrapped batten bar 5 is then inserted into the angle of the top flange 64 of the foundation mounting bracket 6 to reversibly secure the foundation batten bar to the foundation mounting bracket 6. The tension on the composite fabric 1 and foundation batten bar 5 causes the batten bar to be held in the angle of the top flange 64 and the central portion 62 of the foundation mounting bracket 6. The foundation mounting bracket 6 has slots 25 and holes 26, and is affixed with suitable bolts 17 and anchors 20 having flanges or washers, as known to those of ordinary skill in the art, set through the slots 25 and holes 26 into the exterior side of the foundation wall 30. The bolts may be for example Maxi-Set Tapcon® bolts, and the anchors may be for example Redi-Drive® Anchors.

The foundation mounting bracket 6 is initially affixed to the foundation wall 30 by use of three Tapcon Maxi-Set® concrete anchor bolts 17, or other suitable bolts with flanges or washers perpendicular to the face of the composite fabric 1 and through the plurality of holes 26 and slots 25 in the foundation mounting bracket 6 along its vertical face. The preferred bolt being the Tapcon Maxi-Set® bolt 17 manufactured by Illinois Tool Works. Once the roof loading has been achieved then the foundation mounting bracket 6 is re-tightened by loosening the bolts 17 and stepping on the foundation mounting bracket step ledge 66 to take-up any slack in the composite fabric 1, and then pulled downward to make taut. Once taut the bolts 17 are re-tightened. Once the foundation mounting bracket 6 has been post-load tensioned, permanent anchor 20 are installed horizontally in the plurality of holes provided (disposed 12" across the Foundation Mounting Bracket 6) to permanently attach the Foundation Mounting Bracket 6 to the exterior face of the foundation wall 30. The preferred anchor 20 being the Redi-Drive® Masonry Anchor (finished head) manufactured by ITW Red Head.

Figure 8:
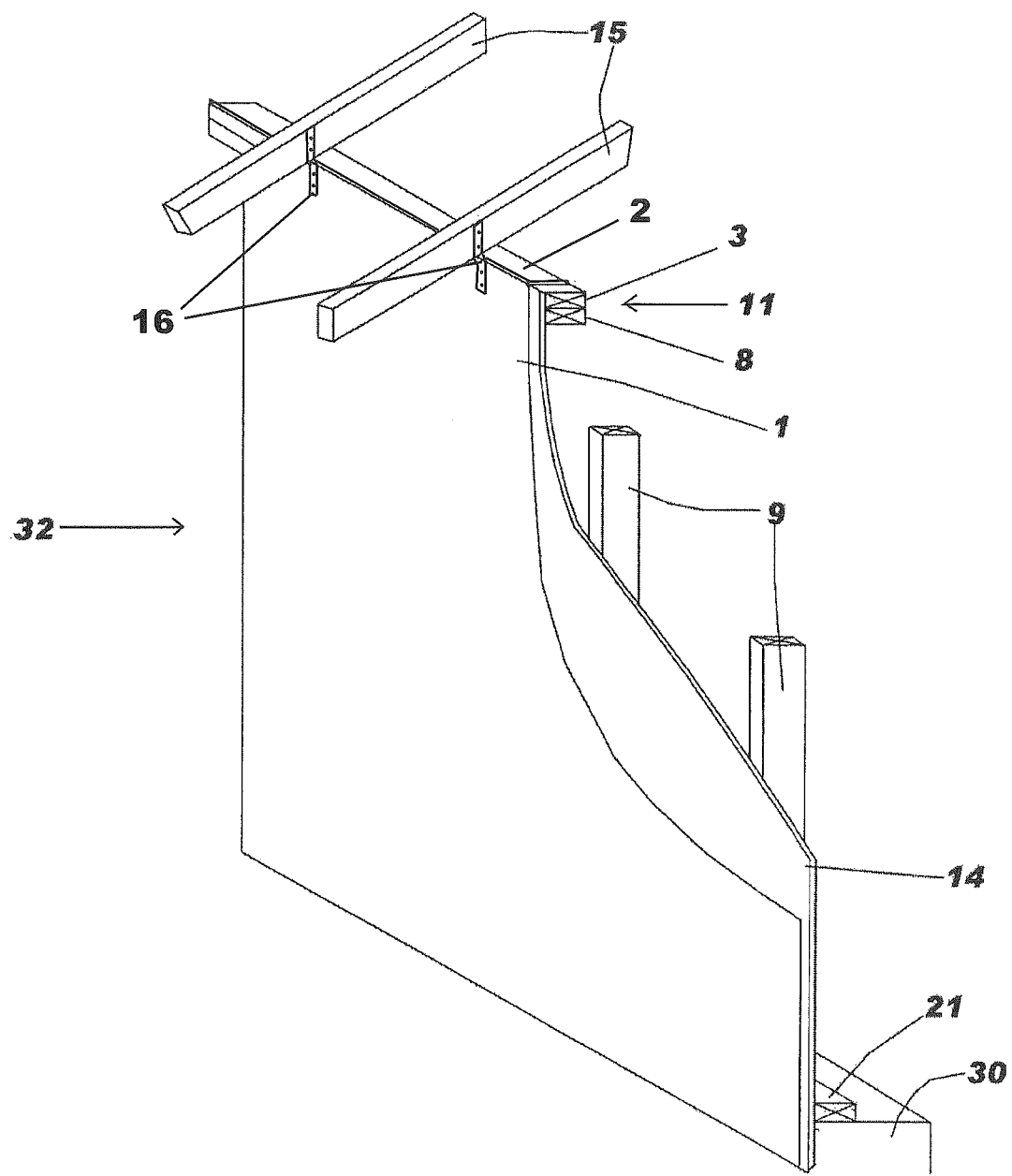
FIG. 8 shows a perspective view of a first embodiment of the invention implementing a top mounting plate with additional roof fastening members.

In the embodiment shown in FIG. 8, in which the first holding member is a top mounting plate 2 that is mechanically affixed to the upper top plate 3 of a frame wall and forms a continuous load path to the foundation, the framing members forming the roof are preferably operatively connected to the framing members forming the wall with roof fastening members 16 such as straps, clips or brackets. In particular, the straps, clips or brackets are mechanically affixed to the rafters or trusses of a roof 15 and the top plates 11 of the frame wall 32 with mechanical fasteners to thereby operatively connect the rafters or trusses with the stud wall 32 and form a continuous load path between the roof and wall of the frame structure. FIG. 8 shows the roof fastening members, such as straps, clips or brackets, securing the roofing members to the frame wall members to provide a continuous load path from the roof members through the roof fastening members to the frame wall members, and from the frame wall members through the flexible sheeting to the retaining member and thereby to the foundation. The first holding member, second holding member, flexible sheeting and retaining member provide the continuous load path from the upper portion of the wall to the foundation. The combination of the roof fastening member connection and the flexible sheeting connection forms a continuous load path from the roofing members to the foundation that can resist the upward or lateral forces on the frame structure. This embodiment provides a continuous load path to resist upward and lateral forces on the roofing members, when a first holding member cannot be affixed directly to the roofing members.

Figure 9:
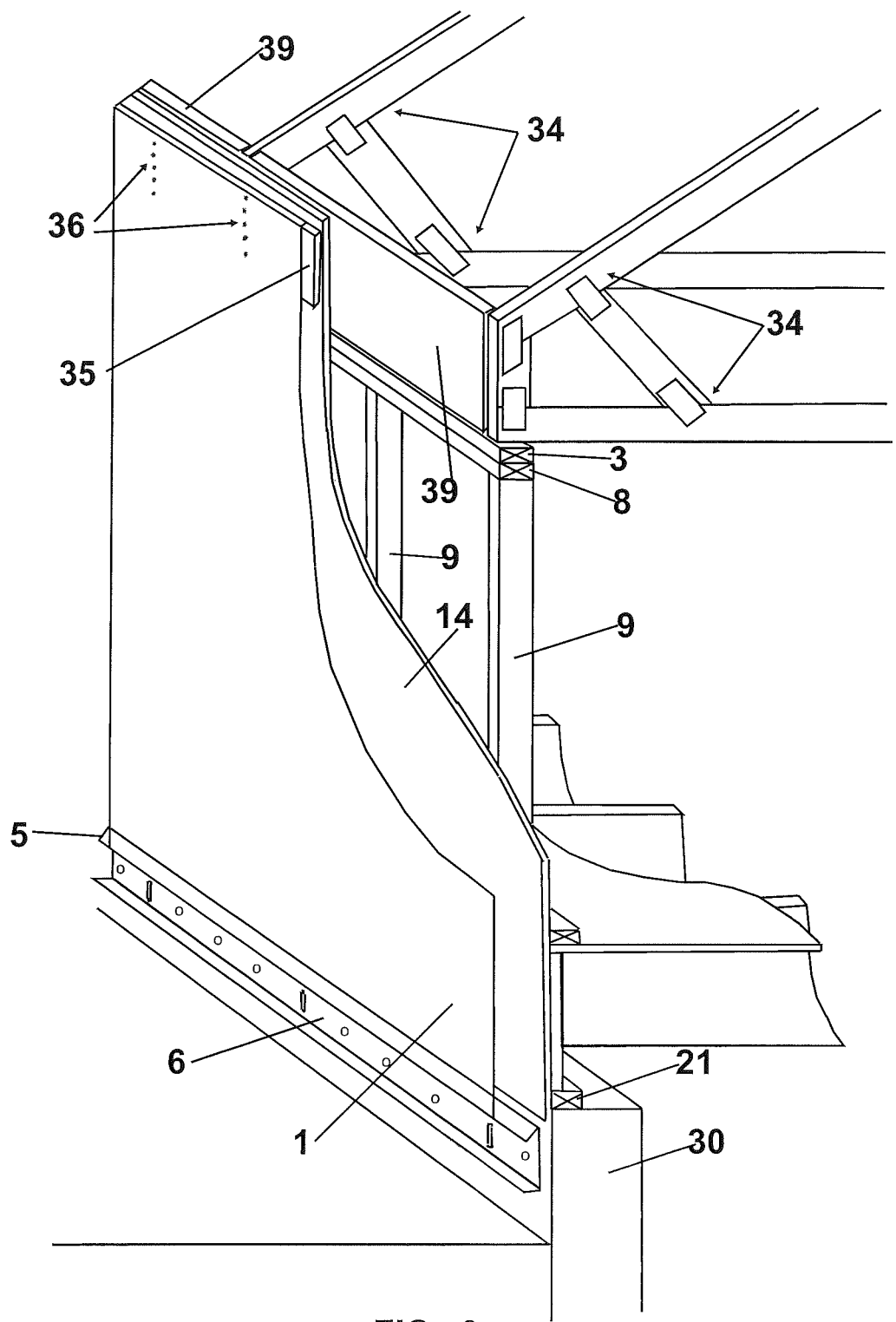
FIG. 9 shows a perspective view of a second embodiment of the invention implementing a truss mounting plate on a high heel truss roof.

In another example of a preferred embodiment, as shown in FIG. 9, the composite fabric 1 is wrapped around and attached to the truss mounting plate 35, with a suitable adhesive that is applied to the truss mounting plate 35 and a portion of the edge of the composite fabric 1 sufficient to wrap the composite fabric around the truss mounting plate 35 three (3) times, so that the composite fabric is securely attached to the truss mounting plate 35. The wrapped truss mounting plate 35 is then affixed mechanically to the sidewall of a raised or high heel roof truss 34 and to its blocking 39 and sheathing 14 with nails. The composite fabric 1 is then extended downwardly on the exterior side of the sheathing to the upper portion of the foundation wall 30. The composite fabric 1 at its bottom end is shown wrapped around the foundation batten bar 5 and inserted into the foundation mounting bracket 6 which is affixed by means of bolts 17 and anchors 20 to the exterior side of the foundation wall 30.

The edge of the composite fabric 1 opposite the truss mounting plate 35 is wrapped around a foundation batten bar 5 three (3) times clockwise and attached using an adhesive in the same manner as described for the truss mounting plate 35. The wrapped batten bar 5 is then inserted into the angle of the top flange 64 of the foundation mounting bracket 6 to reversibly secure the foundation batten bar to the foundation mounting bracket 6. The tension on the composite fabric 1 and foundation batten bar 5 causes the batten bar to be held in the angle of the top flange 64 and the central portion 62 of the foundation mounting bracket 6. The foundation mounting bracket 6 has slots 25 and holes 26, and is affixed with suitable bolts 17 and anchors 20 having flanges or washers, as known to those of ordinary skill in the art, set through the slots 25 and holes 26 horizontally into the exterior side of the foundation wall 30. The bolts may be for example Maxi-Set Tapcon® bolts, and the anchors may be for example ®-Drive Anchors.

The foundation mounting bracket 6 is initially affixed to the foundation wall 30 by use of three Maxi-Set Tapcon® concrete anchor bolts 17, or other suitable bolts with flanges or washers perpendicular to the face of the composite fabric 1 and through the plurality of holes 26 and slots 25 in the foundation mounting bracket 6 along its vertical face. The preferred bolt being the Tapcon Maxi-Set® bolt 17 manufactured by Illinois Tool Works. Once the roof loading has been achieved then the foundation mounting bracket 6 is re-tightened by loosening the bolts 17 and stepping on the foundation mounting bracket step ledge 66 to take-up any slack in the composite fabric 1, and then pulled downward to make taut. Once taut the bolts 17 are re-tightened. Once the foundation mounting bracket 6 has been post-load tensioned, permanent anchors 20 are installed horizontally in the plurality of holes provided (disposed 12" across the Foundation Mounting Bracket 6) to permanently attach the Foundation Mounting Bracket 6 to the exterior face of the foundation wall 30. The preferred anchor 20 being the Redi-Drive® Masonry Anchor (finished head) manufactured by ITW Red Head.

The same implementation can be used when the roofing members 15 have been attached to the top plates 11. In such an instance, the truss mounting plate would be mechanically affixed at the upper portion of the frame wall to the edges of the top plates 11 and the wall studs 9. The composite fabric 1 is then extended downwardly on the exterior side of the sheathing 14 to the foundation wall 30. The composite fabric 1 at its bottom end is shown wrapped around the foundation batten bar 5 and inserted into the foundation mounting bracket 6 which is affixed by means of bolts 17 and anchors 20 to the exterior side of the foundation wall 30. The combination of the roof fastening member connection and the flexible sheeting connection forms a continuous load path from the roofing members to the foundation that can resist the upward or lateral forces on the frame structure. This embodiment provides a continuous load path to resist upward and lateral forces on the roofing members, when a first holding member cannot be affixed directly to the roofing members.

This represents a preferred embodiment of the apparatus of a wind resistant fastener of the present invention showing the disposition of the composite fabric 1 adjacent to the frame wall supporting the roof structure. It shows the composite fabric 1 disposed vertically along the surface of the exterior wall section of the building, said composite fabric extending upward and being secured at the top of the means for securing by virtue of being wrapped around and glued to the high heel truss mounting plate 35 which is affixed mechanically by the use of nails 36 to the sidewall of a raised or high heel roof truss and to its blocking and sheathing. The HurriQuake® Sheathing Nail is the preferred nail to be used, and it is manufactured by Stanley Bostitch.

Figure 10:
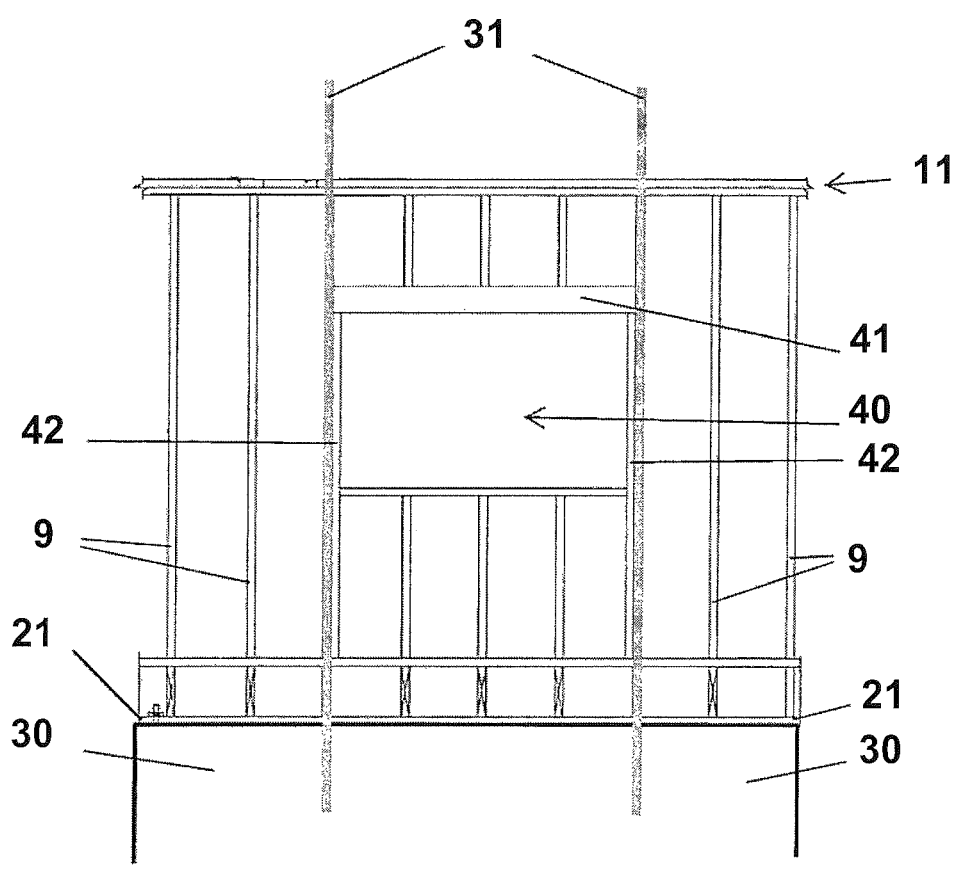
FIG. 10 shows an elevation view of a frame structure implementing polymer batten strips where there is an opening in the frame wall.

The preferred embodiment shown in FIG. 10, can be implemented when there is an opening 40 in a frame wall, such as a window or door. A polymer batten strip 31 can be mechanically affixed vertically to a framing member, such as a jack stud or trimmer 42 placed on either side of the frame opening 40. The polymer batten strip reinforces the flexible sheeting 1 and augments the continuous load path around the window or door opening. The polymer batten strip 31 operatively connects the roofing members, frame wall members and foundation. At its top end the Polymer Batten Strip 31 is attached to the rafters 15 or to the sidewall of a raised or high heel roof truss 34 and its blocking 39 and sheathing 14. The mechanism for mechanically affixing the Polymer Batten Strip 31 to the rafters 15 is wood screws with flat heads and washers disposed through the web of the Polymer Batten Strip 31 and into the rafter. The mechanism for mechanically affixing the Polymer Batten Strip 31 to the sidewall of a raised or high heel roof truss 34 and its blocking 39 and sheathing 14 is wood screws with flat heads and washers disposed through the web of the Polymer Batten Strip 31 and the sidewall of a raised or high heel roof truss 34 and its blocking 39 and sheathing 14. The polymer batten strip 31 can also be affixed to the top plates 11 of the frame wall 32. The lower end of the Polymer Batten Strip 31 is then extended for attachment to the foundation wall 30. The Polymer Batten Strip 31 is mechanically fastened to the foundation 30 by means of bolts 17 and anchors 20 to the exterior side of the foundation wall. The Tapcon Maxi-Set® concrete anchor bolts, or other suitable bolts with flanges or washers perpendicular to the face of the Polymer Batten Strip 31 and through the plurality of holes in the web of the Polymer Batten Strip 31 utilizing at least 3 bolts along the horizontal face of the foundation wall 30. The preferred bolt being the Tapcon Maxi-Set® bolt manufactured by Illinois Tool Works.

The polymer batten strip is preferably ½-2 inches in width, or more preferably between about ¾-1 inch in width. The thickness of the polymer batten strip is preferable between 3/32-1/32 inches, and more preferably between about 1/16 and 3/64 inches. The polymer batten strip typically comes as a coil 250 feet in length. A preferred form of batten strip is one which is manufactured by the Buildex division of OMG, which is made from a polyolefin resin. Said Polymer Batten Strip 31 is an elongated flat thin strap 0.050 inches thick with a width of one inch. The Buildex Polymer Batten Strip 31 is prepackaged in 250 foot coils and has been used extensively to secure roofing material. The Buildex Polymer Batten Strip 31 manufactured by Buildex has a melting point of approximately 300 degrees which is suitable for use as set forth in this application, has excellent UV resistance and having it covered by the Composite Fabric 1 where said Composite Fabric is glued to and wrapped around the Polymer Batten Strip 31 makes it suitable to the long term application.

Figure 11A:
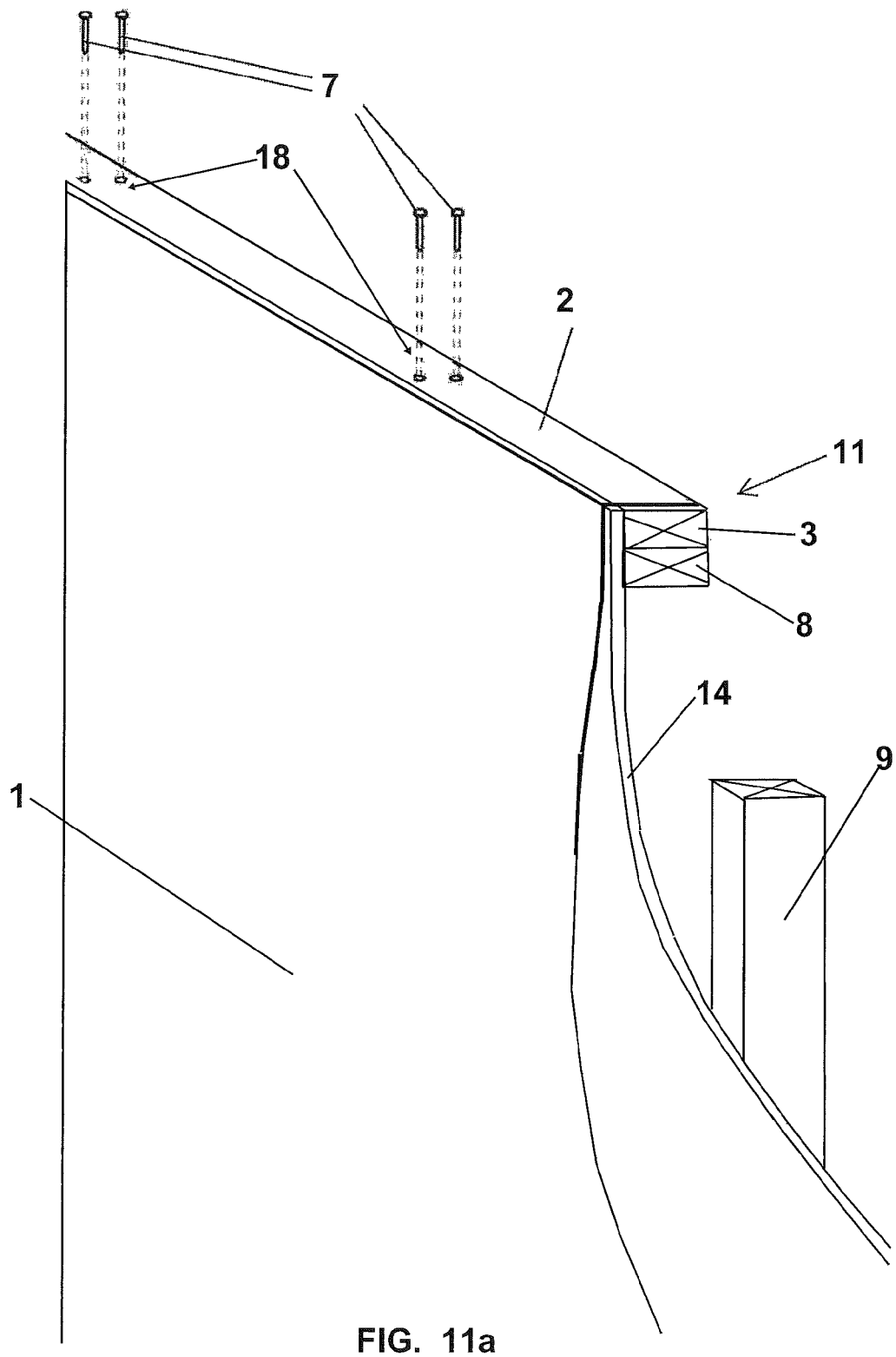
FIG. 11a shows a perspective view of the attachment of a top mounting plate to a stud wall.

FIG. 11*a* shows how the top mounting plate 2 with attached flexible sheeting 1 is specifically affixed to the upper portion of a stud wall by driving two (2) 16 penny nails 7 through the upper top plate 3 and lower top plate 8 into each of the wall studs 9. The nails 7 can be driven directly through the material of the top mounting plate 2, or through optional holes 18 spaced along the top mounting plate to so as to coincide with the spacing of the wall studs 9.

Figure 11B:
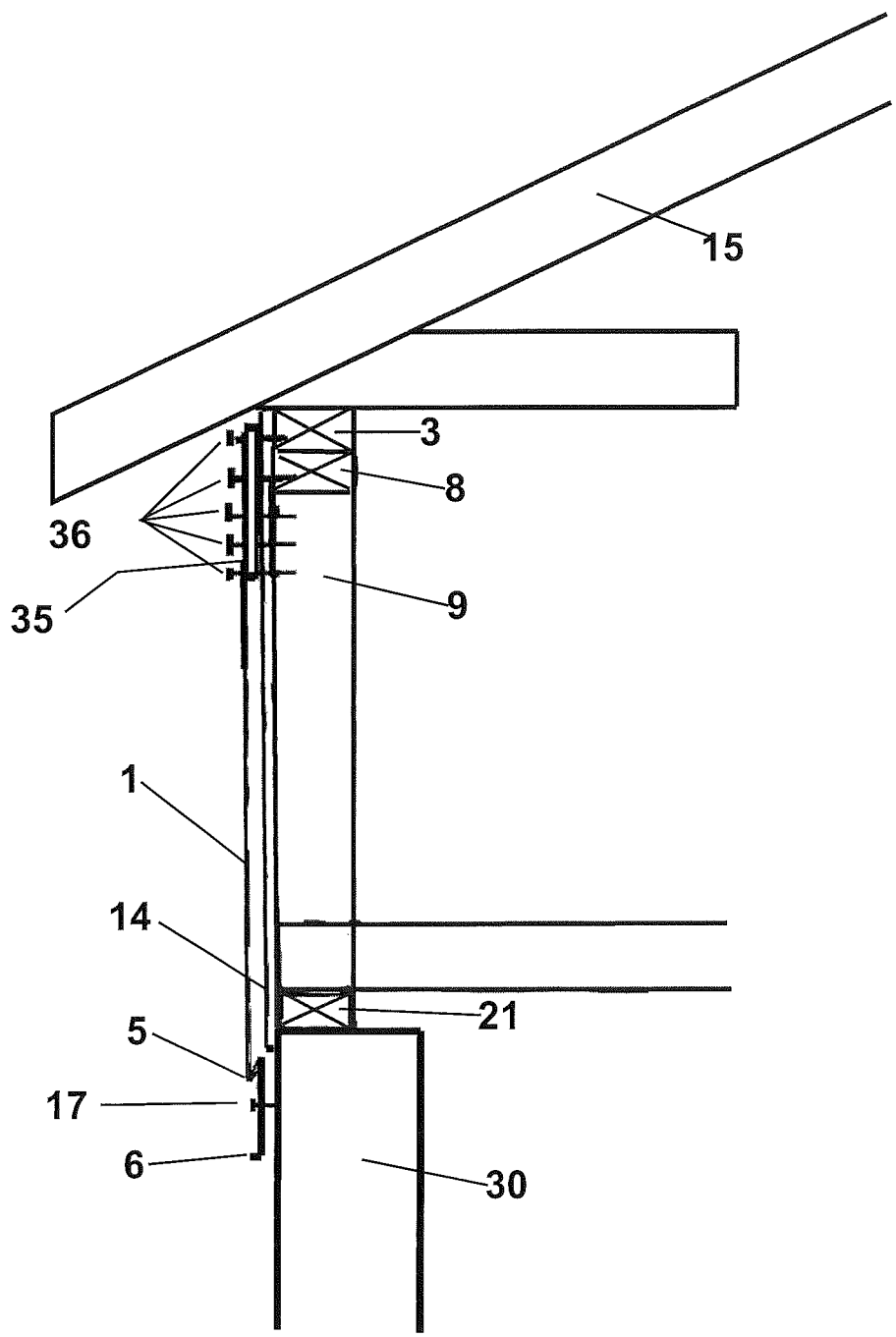
FIG. 11b shows a perspective view of the attachment of a side mounting plate vertically to the top plates and studs.

FIG. 11*b* shows the top mounting plate 2, also referred to as a side mounting plate in this embodiment, mechanically affixed vertically to the top portion of a framed stud wall 32 with mechanical fasteners. The top mounting plate 2 is affixed vertically and on the exterior face of the stud wall with nails 7 that are set through horizontally the top mounting plate into the upper top plate 3, and nails 7 that are set through horizontally the top mounting plate into the lower top plate 8, and nails 7 that are set through horizontally the top mounting plate into the vertical studs 9 of the stud wall 32 at the intersection of the vertical studs 9 with the lower top plate 8. The top mounting plate 2 is affixed using five (5) nails 7 at every intersection of the top plates 11 with the vertical studs 9 of the stud wall 32.

Figure 12:
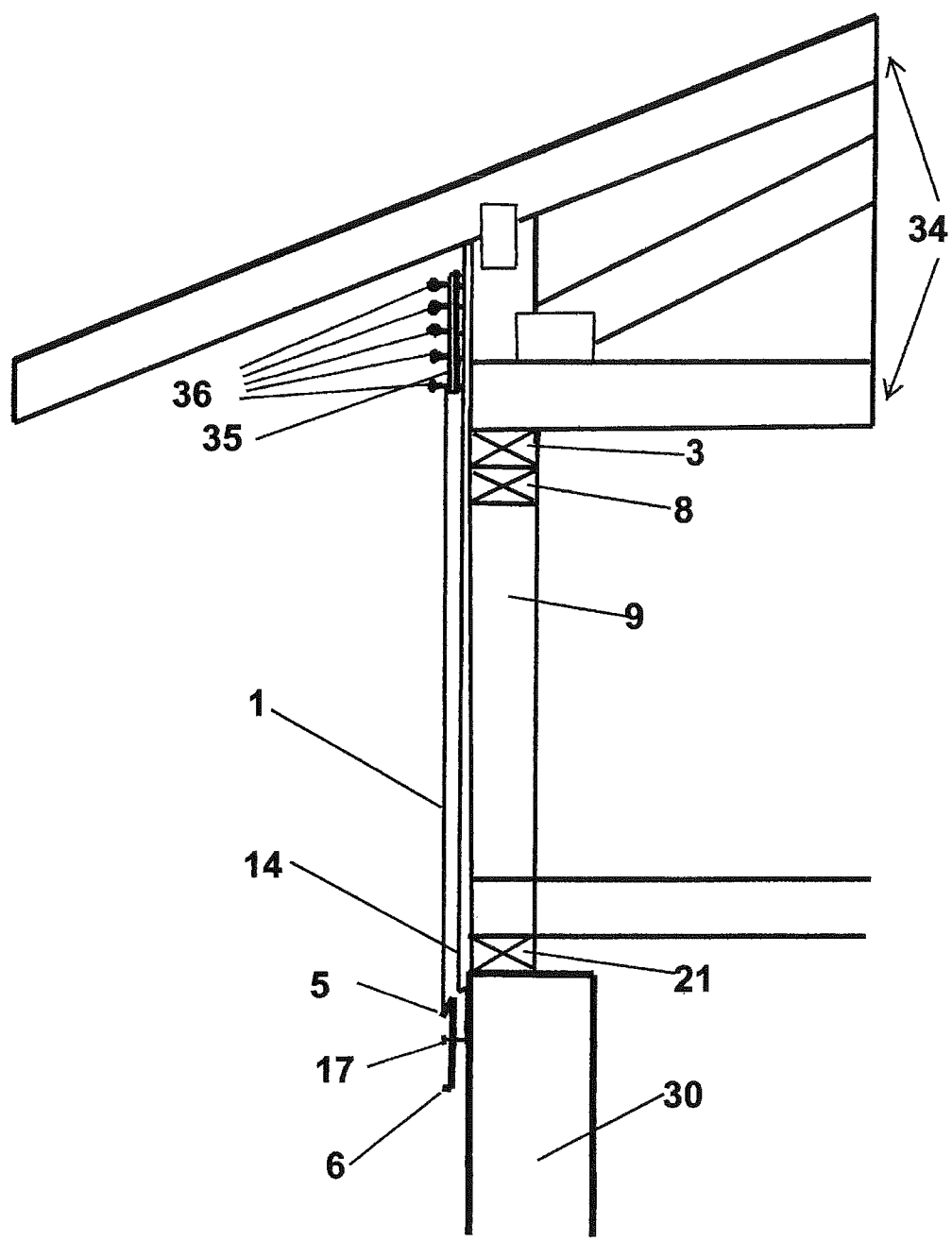
FIG. 12 shows an elevation view of the attachment of a truss mounting plate to a frame structure having a high heel truss roof.

FIG. 12 shows the means for securing disposed vertically on the surface of the exterior wall section, said means extending downward and being secured at the bottom of the means for securing by virtue of being wrapped around the Foundation Batten Bar 5 and inserted into the Foundation Mounting Bracket 6 which Foundation Mounting Bracket 6 together with the inserted Foundation Batten Bar 5 is mechanically fastened to the means for supporting the wall section, i.e., the foundation 30. The Composite Fabric 1 at its bottom end is shown wrapped around the Foundation Batten Bar and inserted into the Foundation Mounting Bracket 6 which is affixed by means of bolts and anchors to the exterior side of the foundation wall. This represents a preferred embodiment of the apparatus of a wind resistant fastener of the preset invention showing the disposition of the Composite Fabric 1 adjacent to the means for supporting the roof structure. It shows the means for securing disposed vertically on the surface of the exterior wall section of the building, said means extending upward and being secured at the top of the means for securing by virtue of being wrapped around, glued and fastened to a High Heel Truss Mounting Plate 35 which is affixed mechanically by the use of nails to the to the sidewall of a raised or high heel truss and its blocking and sheathing. It shows the means for securing disposed vertically on the surface of the exterior wall section, said means extending downward and being secured at the bottom of the means for securing by virtue of being wrapped around the Foundation Batten Bar and inserted into the Foundation Mounting Bracket which is mechanically fastened by bolts and anchors to the means for supporting the wall section, i.e., the foundation.

Figure 13:
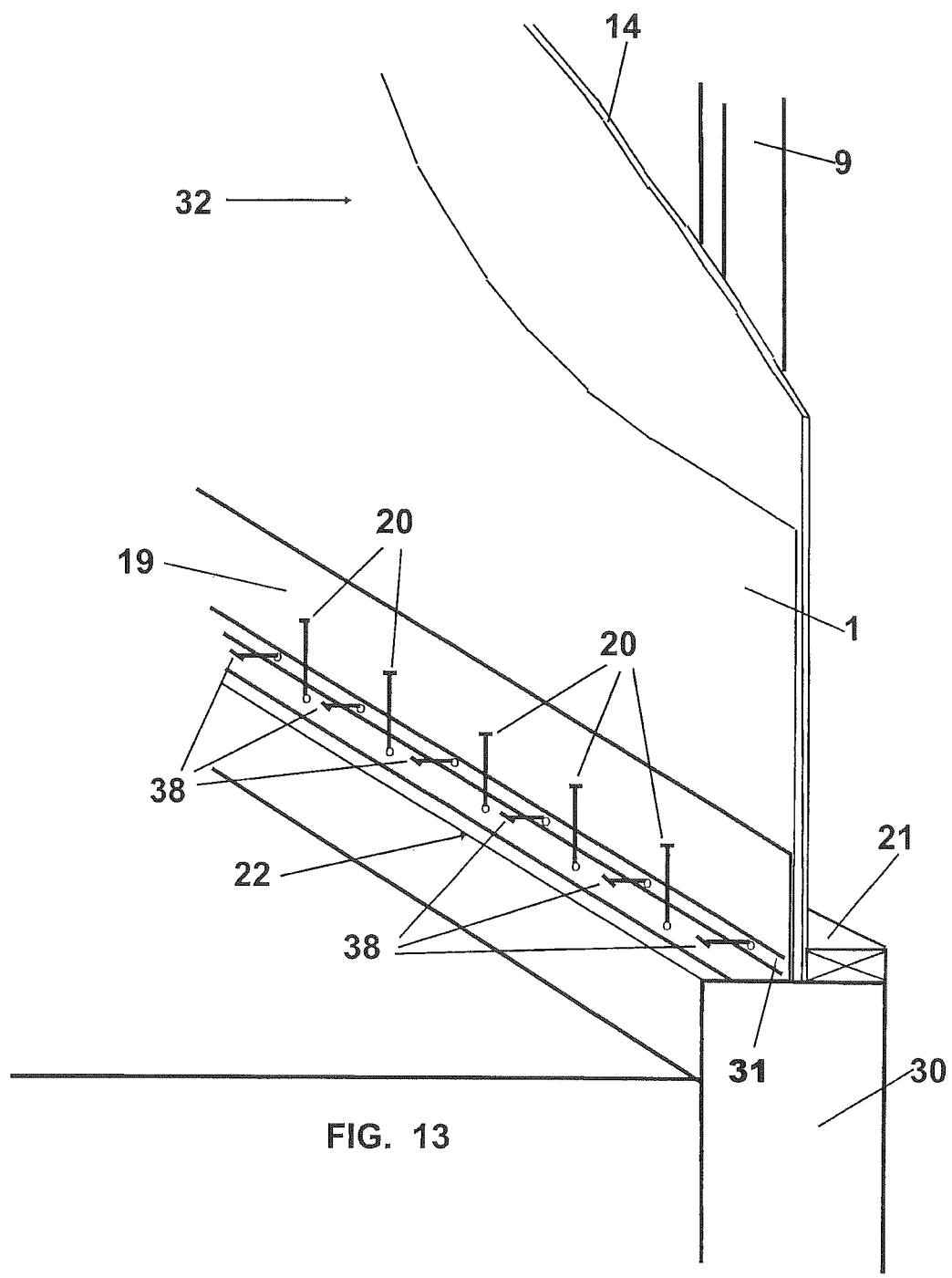
FIG. 13 shows a perspective view of the attachment of an angle bracket to a foundation.

The embodiment in FIG. 13 shows the installation of the composite fabric 1 on a foundation 30 with a brick ledge for a brick veneer applications. The detail shows the top face 22 of the foundation wall 30, the bottom section of a stud wall 32 including the sill plate 21, vertical studs 9, sheathing 14 and the composite fabric 1. An angle bracket 19 is affixed to the top 22 of the foundation wall 30 by use of bolts 20 inserted vertically downward across the top 22 of the foundation wall. It also shows the composite fabric 1 having been wrapped around a polymer batten strip 31 and then being affixed to the vertical side of the angle bracket 19 by use of bolts spaced six (6) inches apart. Said horizontally disposed bolts 38 are installed through the Polymer Batten Strip and into the vertical face of the angle bracket 19. The holes 26 of the vertically displayed face of the angle bracket 19 are staggered with the holes which are horizontally arrayed for the bolts affixing the angle bracket to the foundation, so as not to interfere with each other.

Figure 14:
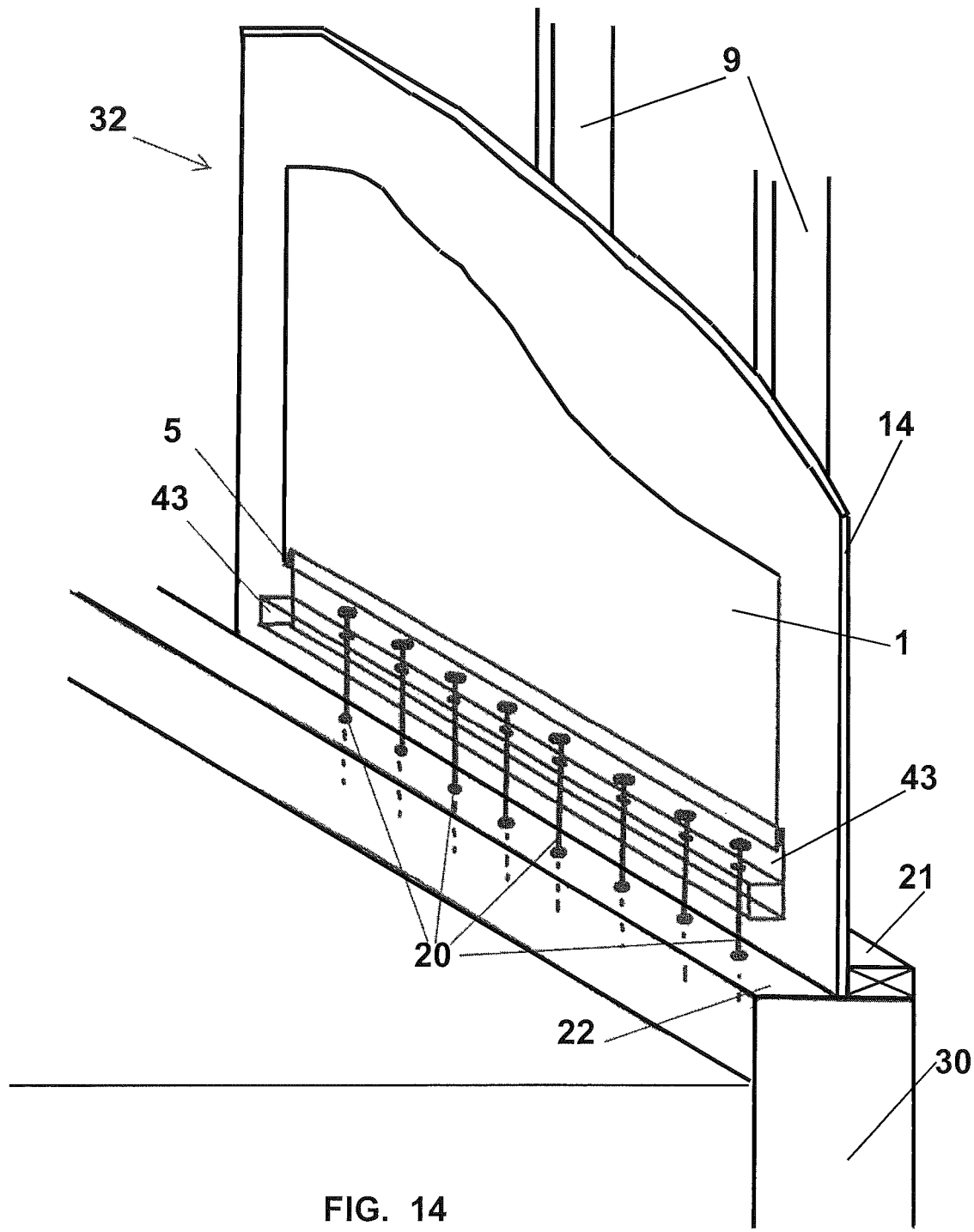
FIG. 14 shows a perspective view of the attachment of a brick ledge box mounting bracket to a foundation.

The embodiment shown in FIG. 14 is a brick ledge box mounting bracket 43 mechanically affixed to the top face 22 of a foundation wall 30 with a brick ledge for brick veneer applications with mechanical fasteners, such as bolts 20, where the bolts pass through the upper wall 435 and lower wall 437 of the box tube portion 436 of the a brick ledge box mounting bracket 43. The mechanical fasteners have an extended length which allows the brick ledge box mounting bracket to float above the top face 22 of the foundation 30, rather than sitting flush on the top face 22. The use of extended length mechanical fasteners provides a range of travel of the brick ledge box mounting bracket 43 sufficient to allow the fasteners to be retightened as required prior to the installation of the brick veneer coursing.

The edge of the composite fabric 1 is wrapped around a foundation batten bar 5 three (3) times clockwise and attached using an adhesive. The wrapped batten bar 5 is then inserted into the angle of the top flange 434 of the brick ledge box mounting bracket 43 to reversibly secure the foundation batten bar 5 to the brick ledge box mounting bracket 43. The tension on the composite fabric 1 and foundation batten bar 5 causes the batten bar to be held in the angle of the top flange 434 and the central portion 432 of the brick ledge box mounting bracket 43.

Figure 15:
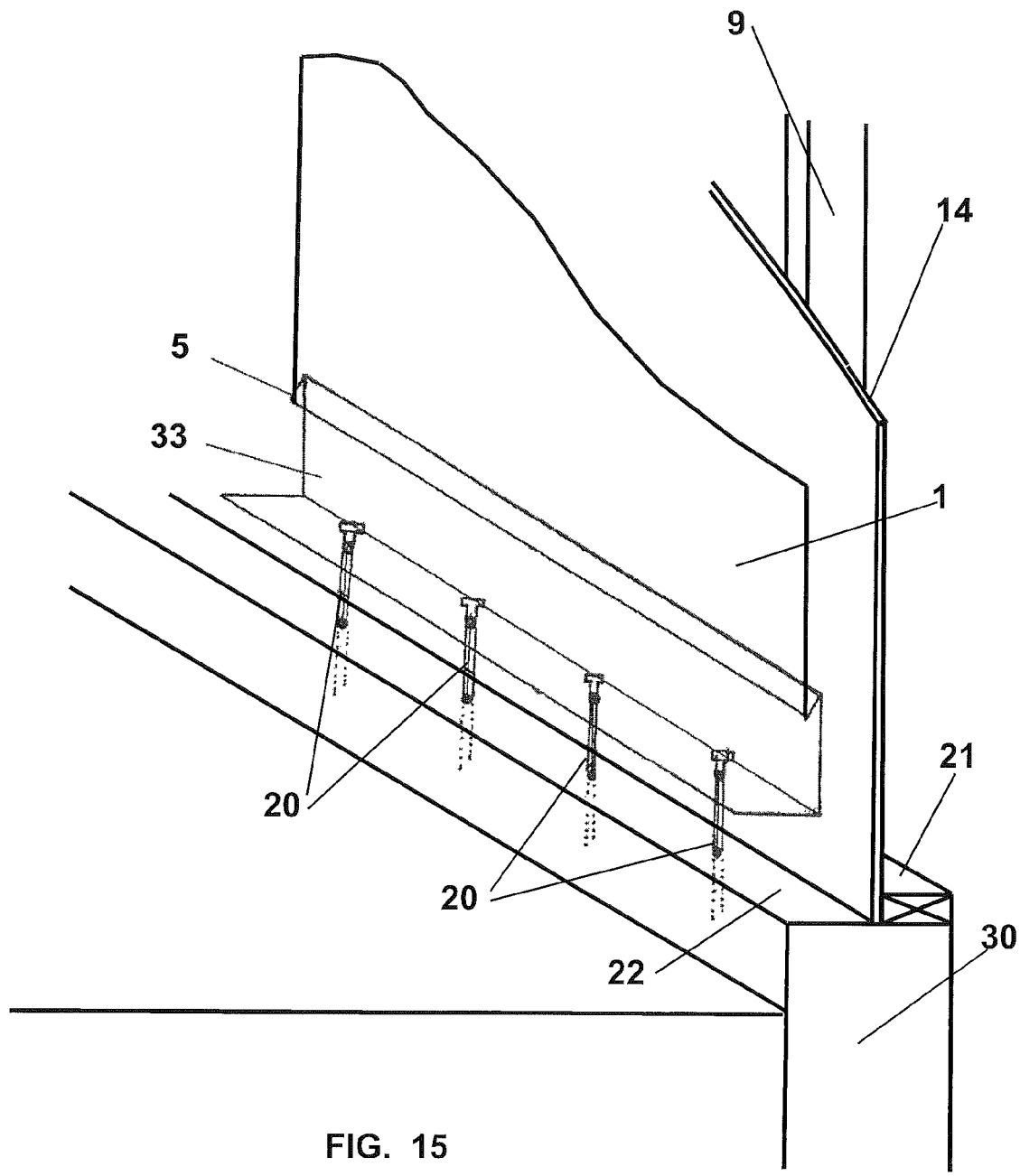
FIG. 15 shows a perspective view of a polymer angle bracket attached to a foundation having a brick ledge.

The embodiment shown in FIG. 15 is a polymer angle bracket 33 mechanically affixed to the top face 22 of a foundation wall 30 with a brick ledge for brick veneer applications with mechanical fasteners, such as bolts 20. The mechanical fasteners have an extended length which allows the brick ledge box mounting bracket to float above the top face 22 of the foundation 30, rather than sitting flush on the top face 22. The use of extended length mechanical fasteners provides a range of travel of the polymer angle bracket 33 sufficient to allow the fasteners to be retightened as required prior to the installation of the brick veneer coursing.

An example of another one of the preferred embodiments of the apparatus of the invention where the installation of the Composite Fabric 1 is to be installed on a foundation 30 with a brick ledge 22 for a brick veneer application is shown in FIGS. 13 and 15, where an angle bracket 19 which is 2"×4"× ¼" is affixed to the top horizontal portion of the foundation wall 30 adjacent to the vertical stud wall 32 by use of bolts, the preferred embodiment is the Trubolt® Wedge Anchors 20 manufactured by ITW Red Head, spaced six (6) inches apart and installed downward across the top of said foundation wall 30. Said angle bracket 19 shall have a plurality of holes spaced six (6) inches apart on each of its planes. Said holes shall be staggered so as to provide the holes of one plane are each approximately three (3) inches apart from alignment with the other plane. Said angle bracket 19 shall be affixed to the foundation 30 by use of Trubolt® Wedge Anchors 20 which shall extend up from the foundation a minimum of three (3) inches. Said angle bracket 19 shall have its bolts partially tightened leaving at least two (2) inches for post load adjustment and re-tightening. The spacing of the holes on the angle bracket 19 shall be staggered (see FIG. 4) so that the holes on the horizontal plane align three (3) inches from the holes on the vertical plane. Before the angle bracket 19 is affixed to the top horizontal portion of the foundation wall 30, The composite fabric 1 is wrapped around and glued to the either the polymer batten strip 31 or the top mounting plate 2, and then the polymer batten strip 31 or top mounting plate 2, as the case may be, is pulled downward to become taut and then is affixed to the vertical side of the aforementioned angle bracket 19 by use of bolts 17 which shall be every 6" across its length. The top end of this embodiment shall be installed as shown in FIG. 7, 8, 9, 11a, 11b or 12 and as described in the corresponding paragraphs above. The dimensions of the angle bracket 19 design may be adjusted or may be modified consistent with engineering design practice and optimized design consideration, all to yield mechanisms which meet the means and standards used and preferred in the construction and engineering communities.

In another example of the preferred embodiments of the apparatus of the invention where the installation of the Composite Fabric 1 is to be installed on a foundation 30 with a brick ledge 22 for a brick veneer application, see FIG. 15, a Polymer Angle Bracket 33, which is 2½"×5"×¼" is affixed to the top horizontal portion of the foundation wall 30 adjacent to the vertical stud wall 32 by use of Trubolt® Wedge Anchors 20 or other suitable bolts, spaced six (6) inches apart and installed downward across the top of said foundation wall 30. A sheet of Composite Fabric 1 once having been affixed to the top of the stud wall 32 by means of a method set forth in the embodiments listed in this application is then affixed or secured at its bottom end to the foundation 30 by wrapping around the Foundation Batten Bar 5 which has adhesive applied. The Foundation Batten Bar 5, around which has been wrapped the Composite Fabric 1, is then inserted into the top flange of the polymer angle bracket 33, which is then affixed by means of Trubolt® Wedge Anchors 20 or other suitable bolts, downward into the top of the foundation wall. Said vertically disposed bolts or anchors are downwardly installed under the Polymer Angle Bracket and into the top of the foundation six (6) inches apart. The polymer angle bracket is not flush down to the top of the foundation. The bolts are extended length to allow the polymer angle bracket to permanently float above the top of the foundation, and shall extend up from the foundation a minimum of three (3) inches to account for post load retightening. Said bolts 17 are initially tightened until the composite fabric 1 is taut. Once a permanent installation is required, said bolts are retightened to take up any slack and render the composite fabric 1 taut. After the final retightening the polymer angle bracket 33 may be flush with the top of the foundation, as shown in FIG. 13, or the polymer angle bracket 33 may permanently float above the top of the foundation, as shown in FIG. 15. The top end of this embodiment shall be installed as shown in FIG. 7, 8, 9, 11a, 11b or 12, and as described in the corresponding paragraphs. The dimensions of the polymer angle bracket 33 design may be adjusted or may be modified consistent with engineering design practice and optimized design consideration, all to yield mechanisms which meet the means and standards used and preferred in the construction and engineering communities.

In another example of a preferred embodiment as shown in FIG. 10, a supplemental mechanism, the Polymer Batten Strip 31 is utilized to augment the continuous load path around the window opening. The Polymer Batten Strip 31 constitutes a vertically securing mechanism disposed adjacent to the means and operatively connecting the roof structure and the means for supporting, the foundation 30. It serves as an auxiliary fastener connecting the roof of the structure to the foundation. The Polymer Batten Strip 31 is located adjacent to and on the exterior side of the jack studs or trimmers 42 of the window framing, see FIG. 10. At its top end the Polymer Batten Strip 31 is attached to the rafters 15 or to the sidewall of a raised or high heel roof truss 34 and its blocking 39 and sheathing 14. The mechanism for mechanically affixing the Polymer Batten Strip 31 to the rafters 15 is wood screws with flat heads and washers disposed through the web of the Polymer Batten Strip 31 and into the rafter. The mechanism for mechanically affixing the Polymer Batten Strip 31 to the sidewall of a raised or high heel roof truss 34 and its blocking 39 and sheathing 14 is wood screws with flat heads and washers disposed through the web of the Polymer Batten Strip 31 and the sidewall of a raised or high heel roof truss 34 and its blocking 39 and sheathing 14. The lower end of the Polymer Batten Strip 31 is extended for attachment to the foundation wall 30. The Polymer Batten Strip 31 is mechanically fastened to the means for supporting the wall section, i.e., the foundation 30 by means of bolts and anchors to the exterior side of the foundation wall. The Tapcon Maxi-Set® concrete anchor bolts 17, or other suitable bolts with flanges or washers perpendicular to the face of the Polymer Batten Strip 31 and through the plurality of holes in the web of the Polymer Batten Strip 31 utilizing at least 3 bolts along the horizontal face of the foundation wall 30. The preferred bolt being the Tapcon Maxi-Set® bolt 17 manufactured by Illinois Tool Works. This represents a preferred embodiment of the apparatus of a wind resistant fastener of the present invention showing the disposition of the Polymer Batten Strip 31 adjacent to the means for supporting the roof structure. It shows the means for securing disposed vertically on the surface of the exterior wall section of the building adjacent to and on the exterior side of the jack studs or trimmers 42 of the window framing. This embodiment applies to openings for windows or other openings like door openings where engineering and construction means and methods require supplementing the load path capacity as a result of the opening in relation to the wall length.

In another embodiment the top or side mounting plate 2 is mechanically affixed vertically, as shown in FIG. 11b, to the top of a framed stud wall 32 with mechanical fasteners. In this embodiment, the top or side mounting plate 2 is affixed vertically and on the exterior face of the stud wall with nails 7 that are set through horizontally the mounting plate into the upper top plate 3, and nails 7 that are set through horizontally the mounting plate into the lower top plate 8, and nails 7 that are set through horizontally the mounting plate into the vertical studs 9 of the stud wall 32 at the intersection of the vertical studs 9 with the lower top plate 8. The preferred dimensions of the top or side mounting plate deployed vertically has, as shown in FIG. 2a, a first dimension A preferably approximately six (6) inches, a second dimension B of preferably six (6) inches less than the width of the flexible material to which it is being attached, and has a third dimension C preferably about three-sixteenths (3/16) of an inch. The top or side mounting plate 2 is preferably affixed using five (5) nails 7 at every intersection of the top plates 11 with the vertical studs 9 of the stud wall 32. The HurriQuake® Sheathing Nail is the preferred nail to be used, and it is manufactured by Stanley Bostitch of East Greenwich, R.I.

In a preferred embodiment of the apparatus the mechanism for securing utilizes a Mounting Bracket Assembly 12 or an alternative Angle Bracket 19, or an alternate Polymer Angle Bracket 33, or a Foundation Mounting Bracket (with out skirt, "wos"), or a brick ledge box mounting bracket 43 to provide a mechanism to affix the Composite Fabric 1 to the structure's foundation 30. The building may have a foundation 30 or slab 29 at its base and essentially vertical walls 28 on its exterior resting on or supported by said foundation 30 or slab 29. The means for securing is preferably vertical and disposed on the surface of the exterior walls, but inside of the structure's final cladding, or in the case of a brick veneer application the means for securing is vertical and disposed on the surface of the exterior was but inside of the brick veneer.

The adhesive to be used to affix the composite fabric 1 to the top or side mounting plate 2, the foundation batten bar 5, and the truss mounting plate 35, shall be consistent with the material used to fabricate the top mounting plate 2, the foundation batten bar 5, and the truss mounting plate 35, and any other materials found in the composite fabric 1. The adhesive used shall also be consistent with the materials used to fabricate the composite fabric 1. A preferred embodiment for the adhesive is Liquid Nails® Polyurethane Construction Adhesive (low VOC) (LN-950) which is manufactured by AKZO NOBEL of 15885 West Sprague Road, Strongsville, Ohio 44136. In addition to adhesive, high strength double sided tapes may be used in connection with affixing the composite fabric 1 to the top or side mounting plate 2, the foundation batten bar 5, and the truss mounting plate 35. Said high strength double sided tapes shall have the properties and strength qualities consistent with the qualities of the adhesives called for in this application.

One embodiment of the apparatus involves combining any or all of the embodiments claimed herein to provide systems or apparatus which provide a continuous load path from a structure's foundation 30 to the roof system by attachment to the sidewall of a raised or high heel roof truss 34 and to its blocking and sheathing.

Any and all permutations or combinations of the listed embodiments claimed herein are also asserted as embodiments. Each and every of said permutations and combinations is separately deemed to be an embodiment herein in its own right, and Engineering appropriate to the structure, the governing code, the local building community, and addressing potential high wind or seismic conditions will govern the use and deployment of the said embodiments and establish separate embodiments herein each and everyone as its own embodiment. Modifications will be obvious to those skilled in the art, and all modifications that do not depart from the spirit of the invention are intended to be included within the scope of the embodiments of the invention. Specifically, any top end of the wall section fastening system set forth herein can be combined with any bottom end of wall section fastening system set forth herein without deviating from the spirit and scope of the present invention.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims.

There has thus been outlined, rather broadly, the more important features of the invention in order that the detailed description thereof may be better understood, and in order that the present contribution to the art may be better appreciated. There are, of course, features of the invention that are described herein. Those skilled in the art will appreciate that the conception upon which this disclosure is based, may readily by utilized as a basis for the designing of other structures, methods, and systems for carrying out the several purposes of the present invention.

What is claimed is:

1. A structural fastening apparatus comprising:
    a flexible sheeting having top and bottom edge portions;
    a first holding member attached along the top edge portion of the flexible sheeting;
    a second holding member attached along the bottom edge portion of the flexible sheeting; and
    a mounting bracket that is configured and dimensioned for attachment to a building foundation, comprising a flange for engaging the second holding member portion that is configured and dimensioned to receive at least a portion of the second holding member,
    wherein the mounting bracket has openings for accepting fasteners suitable for anchoring the mounting bracket to a cement, block or brick foundation, and further wherein at least some of the openings are vertical slots that facilitate movement of the retaining member to apply tension to the flexible sheeting.

2. The apparatus of claim 1, wherein:
    the first holding member has openings for accepting mechanical fasteners for mechanically anchoring the first holding member to an upper portion of a building frame;
    the second holding member is secured to the mounting bracket flange such that the flexible sheeting provides a continuous tensile load path between the upper portion of the building frame and the building foundation, in order to direct upward or lateral forces to the building foundation.

3. A structural fastening apparatus comprising:
    a flexible sheeting having top and bottom edge portions;
    a first holding member attached along the top edge portion of the high strength, flexible sheeting;
    a second holding member attached along the bottom edge portion of the high strength, flexible sheeting;
    a retaining member that is configured and dimensioned to receive at least a portion of the second holding member for tensioning the high strength, flexible sheeting; and
    fasteners having an extended length to provide a gap between the bottom surface of the mounting bracket and an upper surface of a building foundation to adjust the tensioning of the flexible sheeting by tightening or loosening the fasteners, thereby reducing or increasing the gap between the mounting bracket and the upper surface of the foundation; and
    wherein the retaining member is a mounting bracket that is configured and dimensioned for attachment to a building foundation, and includes a flange for engaging the second holding member portion.

4. A frame structure having at least a roofing member and one or more wall members erected upon a foundation, the structure comprising:
    a structural fastening apparatus according to claim 3 providing a continuous tensile load path between the roofing member and the structure's foundation to direct upward or lateral forces to the structure's foundation; wherein:

the first holding member is mechanically affixed to an upper portion of a frame building wall;

the mounting bracket is mechanically anchored to the structure's foundation;

at least a portion of the second holding member is secured to the mounting bracket; and the flexible sheeting is attached to the first and second holding members to provide a continuous load path from the frame wall members through the flexible sheeting to the foundation.

5. The frame structure of claim 4, wherein the flexible sheeting is positioned on the outside face of the frame, and is directly adjacent to and in contact with a sheathing layer of an exterior frame wall to create a continuous load path from the upper portion of a building wall frame to the foundation along a length of the building wall.

6. The frame structure of claim 5 further comprising one or more polymer batten strips, or an additional scrim layer or a plurality of scrim layers, affixed to an exterior frame wall, wherein the polymer batten strip, or the additional scrim layer or the plurality of scrim layers, is affixed in a vertical direction adjacent to one or more openings framed into the exterior frame wall to create a reinforced continuous load path from the upper top plate or upper portion of a building wall frame to the foundation.

7. The frame structure of claim 5, further comprising a roof fastening member mechanically affixed to and operatively connecting one or more roofing member(s) to the building wall frame.

8. The frame structure of claim 4, wherein:

the first holding member has openings for accepting mechanical fasteners for fastening the first holding member in a vertical position to a plurality of roof trusses and blocking members, and the first holding member is mechanically anchored to the building wall frame in a vertical position by the mechanical fasteners;

the mounting bracket is mechanically anchored to the building foundation by the fasteners, wherein the mounting bracket can be retensioned by retightening the fasteners;

the second holding member is secured to the mounting bracket flange; and the high strength, flexible sheeting connects the first holding member to the second holding member to thereby create a continuous tensile load path between a top wall member of the building wall frame and the building foundation, and directs upward or lateral forces to the building foundation.

9. The frame structure of claim 4, wherein the roofing member forms at least part of a raised or high heel roof comprising roof blocking or sheathing, and the first holding member is attached to a sidewall of the roof blocking or sheathing.

10. The frame structure of claim 9, wherein the retaining member is a bracket that is initially affixed to the foundation with adjustable bolts and after adjustment of tension on the flexible member is permanently affixed to a foundation wall.

11. A frame structure having at least a roofing member and one or more wall members erected upon a foundation, the structure comprising:

a flexible sheeting having top and bottom edge portions;

a first holding member attached along the top edge portion of the flexible sheeting, and mechanically affixed to an upper portion of a frame building wall;

a second holding member attached along the bottom edge portion of the flexible sheeting; and a mounting bracket that is configured and dimensioned for attachment to a building foundation, and comprises a flange that is configured and dimensioned to receive at least a portion of the second holding member to provide a continuous tensile load path between the roofing member and the structure's foundation to direct upward or lateral forces to the structure's foundation, wherein:

the mounting bracket is mechanically anchored to the structure's foundation;

at least a portion of the second holding member is secured to the mounting bracket; and the flexible sheeting is attached to the first and second holding members to provide a continuous load path from the frame wall members through the flexible sheeting to the foundation.

12. The frame structure of claim 11, further comprising a roof fastening member mechanically affixed to and operatively connecting one or more roofing member(s) to the building wall frame.

13. The frame structure of claim 11, wherein:

the first holding member has openings for accepting mechanical fasteners for fastening the first holding member in a vertical position to a plurality of roof trusses and blocking members, and the first holding member is mechanically anchored to the building wall frame in a vertical position by the mechanical fasteners;

the mounting bracket is mechanically anchored to the building foundation by fasteners, such that the mounting bracket can be retensioned by retightening the fasteners;

the second holding member is secured to the mounting bracket flange; and the flexible sheeting connects the first holding member to the second holding member to thereby create a continuous tensile load path between a top wall member of the building wall frame and the building foundation, and directs upward or lateral forces to the building foundation.

* * * * *